US012487073B2

(12) United States Patent
Dhasmana

(10) Patent No.: US 12,487,073 B2
(45) Date of Patent: Dec. 2, 2025

(54) SPECKLE REDUCTION METHODS IN LINE SCANNERS

(71) Applicant: FARO Technologies, Inc., Lake Mary, FL (US)

(72) Inventor: Nitesh Dhasmana, Lake Mary, FL (US)

(73) Assignee: FARO Technologies, Inc., Lake Mary, FL (US)

(*) Notice: Subject to any disclaimer, the term of this patent is extended or adjusted under 35 U.S.C. 154(b) by 445 days.

(21) Appl. No.: 17/808,736

(22) Filed: Jun. 24, 2022

(65) Prior Publication Data
US 2022/0316857 A1 Oct. 6, 2022

Related U.S. Application Data

(63) Continuation-in-part of application No. 17/556,083, filed on Dec. 20, 2021, now Pat. No. 11,908,162.
(Continued)

(51) Int. Cl.
*G01B 11/00* (2006.01)
*G02B 27/09* (2006.01)
(Continued)

(52) U.S. Cl.
CPC ........ *G01B 11/005* (2013.01); *G02B 27/0922* (2013.01); *G02B 27/0961* (2013.01); *H04N 23/54* (2023.01); *H04N 23/56* (2023.01)

(58) Field of Classification Search
CPC . G01B 11/005; G01B 11/007; G01B 11/2545; G01B 5/012; G02B 27/0922;
(Continued)

(56) References Cited

U.S. PATENT DOCUMENTS 7,009,717 B2   3/2006   Van Coppenolle et al.
7,231,069 B2   6/2007   Nahata
(Continued)

FOREIGN PATENT DOCUMENTS

CN   106931903 A   7/2017
CN   109900221 A   6/2019
(Continued)

OTHER PUBLICATIONS

Carsten Reich et al: "3-D shape measurement of complex objects by combining photogrammetry and fridge projection" Optical Engineering, Soc. of Photo-Optical Instrumentation Engineers, Bellingham, vol. 39, No. 1, Jan. 1, 2000 (Jan. 1, 2000), pp. 224-231, XP002495170, ISSN: 0091-3286, DOI: 10.1117/1.602356 [retrieved on Jan. 1, 2000].
(Continued)

*Primary Examiner* — Shadan E Haghani
(74) *Attorney, Agent, or Firm* — McCarter & English, LLP; Dave S. Christensen; Joseph C. Drish

(57) ABSTRACT

A system includes a first light source that emits a beam of light; an electrical modulator that imparts a time-varying modulation on the beam of light; a beam-shaping system that shapes the beam of light and projects the shaped beam of light onto an object; an image sensor that captures the beam of light reflected from the object; and processors that determine three-dimensional (3D) coordinates of points on the object.

17 Claims, 33 Drawing Sheets

Related U.S. Application Data

(60) Provisional application No. 63/130,006, filed on Dec. 23, 2020.

(51) Int. Cl.
*H04N 23/54* (2023.01)
*H04N 23/56* (2023.01)

(58) Field of Classification Search
CPC .... G02B 27/0961; H04N 23/54; H04N 23/56; H04N 23/51; G06T 7/521
See application file for complete search history.

(56) References Cited

U.S. PATENT DOCUMENTS

| | | |
|---|---|---|
| 7,428,061 B2 | 9/2008 | Coppenolle et al. |
| 8,970,823 B2 | 3/2015 | Heidmann et al. |
| 9,041,914 B2 | 5/2015 | Tohme et al. |
| 9,217,637 B2 | 12/2015 | Heidemann et al. |
| 9,325,883 B2 | 4/2016 | Bowler et al. |
| 9,482,528 B2 | 11/2016 | Baker et al. |
| 9,599,455 B2 | 3/2017 | Heidemann et al. |
| 9,628,775 B2 | 4/2017 | Bridges et al. |
| 9,671,221 B2 | 6/2017 | Ruhland et al. |
| 9,909,856 B2 | 3/2018 | Bridges |
| 10,070,116 B2 | 9/2018 | Hillebrand et al. |
| 10,088,296 B2 | 10/2018 | Hillebrand et al. |
| 10,089,415 B2 | 10/2018 | Grau |
| 10,309,770 B2 | 6/2019 | Zheng et al. |
| 10,444,009 B2 | 10/2019 | Tohme et al. |
| 11,022,692 B2 | 6/2021 | Heidemann et al. |
| 2014/0192187 A1 | 7/2014 | Atwell et al. |
| 2015/0015898 A1 | 1/2015 | Atwell et al. |
| 2015/0138349 A1 | 5/2015 | Hebert et al. |
| 2016/0073104 A1 | 3/2016 | Hillebrand et al. |
| 2016/0084633 A1 | 3/2016 | Ferrari et al. |
| 2016/0169661 A1 | 6/2016 | Atwell et al. |
| 2016/0210518 A1 | 7/2016 | Script et al. |
| 2016/0254638 A1* | 9/2016 | Chen .................. H04N 13/254 362/11 |
| 2017/0251192 A1 | 8/2017 | Bridges |
| 2017/0272728 A1 | 9/2017 | Rafii et al. |
| 2017/0332069 A1 | 11/2017 | Hillebrand |
| 2019/0113334 A1 | 4/2019 | Wolke et al. |
| 2019/0242697 A1 | 8/2019 | Zheng et al. |
| 2020/0049477 A1 | 2/2020 | Lankalapalli et al. |
| 2020/0225030 A1* | 7/2020 | Zheng .................. G01B 11/245 |
| 2021/0140763 A1* | 5/2021 | Pesach .................. A61B 1/0605 |
| 2021/0142573 A1 | 5/2021 | Tsuda |
| 2022/0198704 A1 | 6/2022 | Atwell et al. |
| 2022/0201269 A1 | 6/2022 | Atwell et al. |
| 2022/0316869 A1 | 10/2022 | Schoenfeldt et al. |
| 2022/0321659 A1 | 10/2022 | Schoenfeldt et al. |
| 2023/0083150 A1 | 3/2023 | Gaarde et al. |
| 2023/0115727 A1 | 4/2023 | Sridhar |
| 2024/0273761 A1 | 8/2024 | Bonarrigo et al. |

FOREIGN PATENT DOCUMENTS

| | | | |
|---|---|---|---|
| CN | 110718284 A | 1/2020 | |
| EP | 3708947 A1 | 9/2020 | |
| JP | 3401783 B2 * | 4/2003 | |
| KR | 10-2021-0071068 A | 6/2021 | |
| WO | WO-2006072149 A1 * | 7/2006 | .......... H01S 5/18311 |
| WO | 2011/116258 A1 | 9/2011 | |
| WO | 2015118467 A1 | 8/2015 | |

OTHER PUBLICATIONS

European Search Report issued Aug. 12, 2022; 6 pgs.
Partial European Search Report issued May 10, 2022; 31 pgs.
Krischke, Anja et al., Components and Tools for Polarization-Maintaing Fiber Optics, Laser Technick Journal, Jan. 2012, WILEY-VCH Verlag Gmbh & Co. KGaA, Weinheim, pp. 30-34.
Vertical-Cavity Surface-Emitting Laser (VCSEL) Diode Array Flir Vcsel Laser Array, Brochure, 2021 FLIR Systems, Inc., www.flir.com/products/flir-vcsel-laser-diodes, 2 pgs.
Microchip, PoE Midspans Multi-Port User Guide. PD-90XXG. Microchip Technology Inc. 27 pages, (2021).
RP Photonics Encyclopedia, Focal Plane Arrays. Retrieved on line at: https://www.rp-photonics.com/focal_plane_arrays.html. 4 pages, retrieved Oct. 12, 2023.
Willomitzer et al., Single-shot three-dimensional sensing with improved data density. Applied Optics. 2015;54(3):408-417.
European Office Action for Application No. 21216565.8, dated Apr. 20, 2022, 14 pages.
European Office Action for Application No. 21216565.8, dated Jul. 26, 2022, 13 pages.
European Office Action for Application No. 23180961.7, dated Oct. 23, 2023, 7 pages.
EP Examination Report EP 23180961.7 dated Aug. 28, 2025.

* cited by examiner

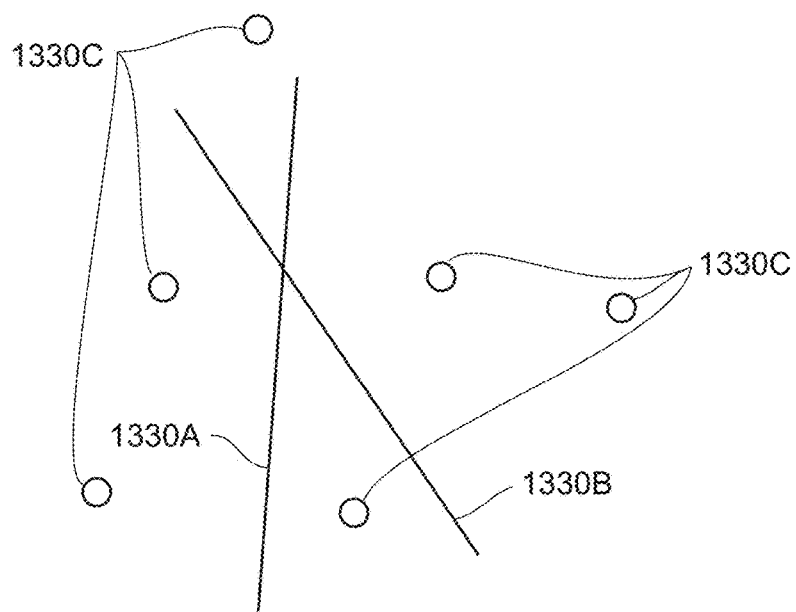
FIG. 13B
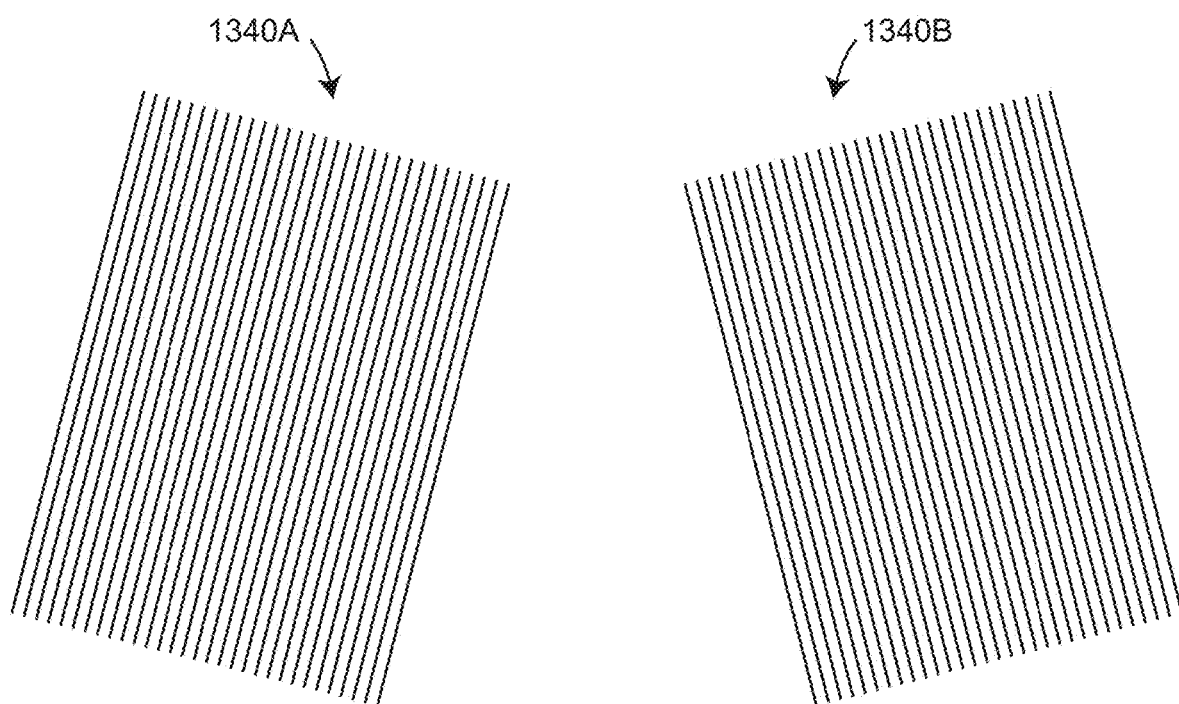
FIG. 13C
FIG. 13D

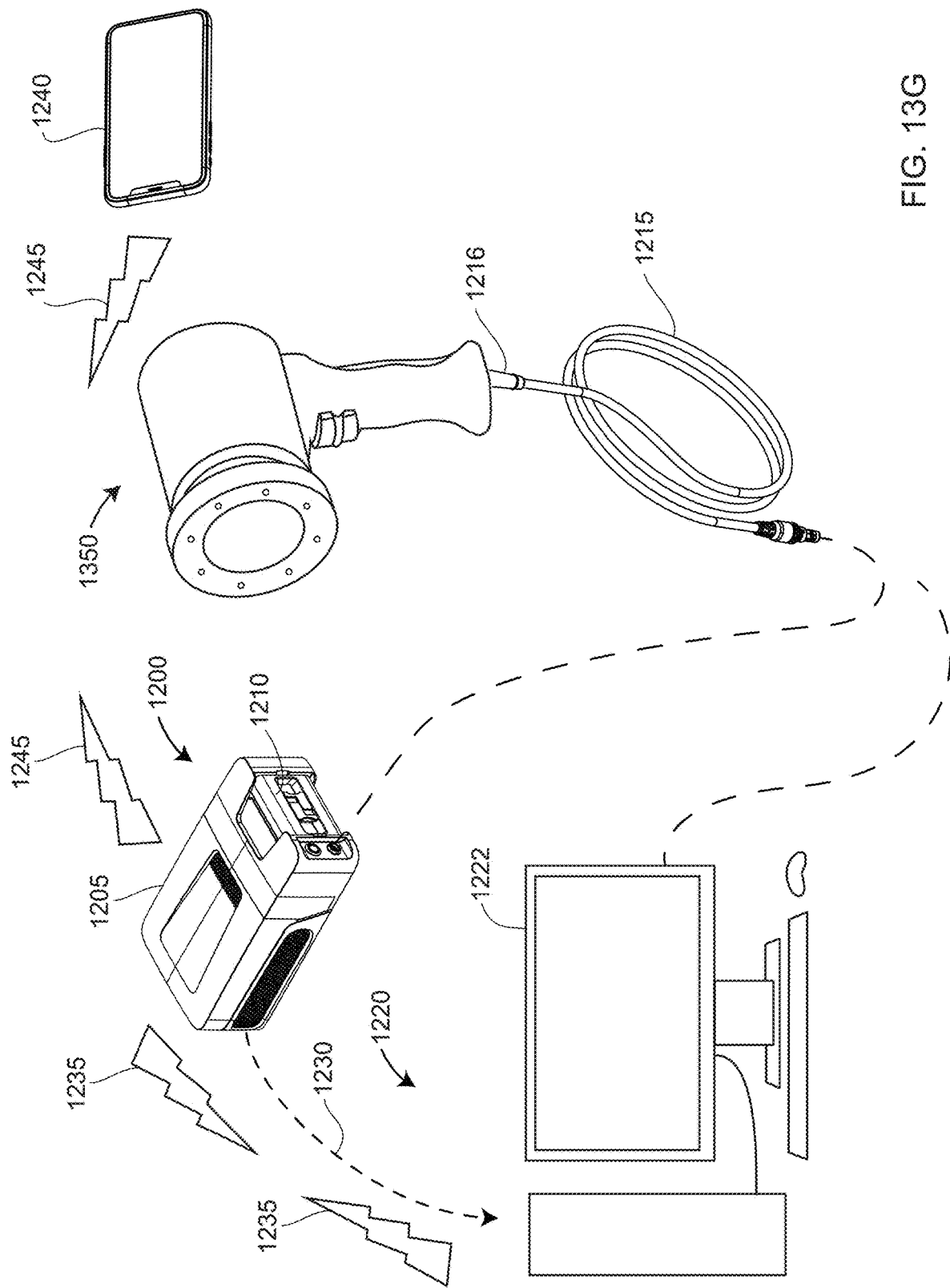

SPECKLE REDUCTION METHODS IN LINE SCANNERS

CROSS REFERENCE TO RELATED APPLICATIONS

The present application is a continuation-in-part application of U.S. patent application Ser. No. 17/556,083 filed on Dec. 20, 2021, which is a nonprovisional application of U.S. Provisional Application No. 63/130,006 filed on Dec. 23, 2020, the contents all of which are incorporated by reference herein.

BACKGROUND

The present disclosure relates to a coordinate measuring system, which may include, for example, a line scanner rigidly or removably affixed to an articulated arm coordinate measuring machine (AACMM) or a handheld line scanner unattached to an AACMM.

A line scanner includes one or more projectors that emit one or more lines of light captured in images by one or more cameras. The relative positions of at least some of the cameras are known relative to at least some of the projectors. One or more processors coupled to the line scanners determines three-dimensional (3D) coordinates of points on objects illuminated by the projected lines of light.

Portable articulated arm coordinate measuring machines (AACMMs) have found widespread use in the manufacturing or production of parts where it is desired to verify the dimensions of the part rapidly and accurately during various stages of the manufacturing or production (e.g., machining) of the part. Portable AACMMs represent a vast improvement over known stationary or fixed, cost-intensive, and relatively difficult to use measurement installations, particularly in the amount of time it takes to perform dimensional measurements of relatively complex parts. Typically, a user of a portable AACMM simply guides a probe along the surface of the part or object to be measured.

A probe such as a tactile probe or a laser line probe (LLP), defined as a line scanner in the form of a probe, is used to measure 3D coordinates of points on an object. A tactile probe typically includes a small spherical probe tip that is held in contact with a point to be measured. An LLP, typically held away from the object, emits a line of light that intersects the object. A camera captures an image of the projected light on the object, and a processor evaluates the captured image to determine corresponding 3D coordinates of points on the object surface.

In some cases, the LLP on the AACMM may be removed from the AACMM and used in a handheld mode to measure 3D coordinates of points on an object. Alternatively, the LLP may be designed for use entirely in a handheld mode without the possibility of attachment to an AACMM.

An LLP attached to an AACMM or a handheld line scanner uses the principle of triangulation to determine 3D coordinates of points on an object relative to the LLP coordinate system (frame of reference). When attached to an AACMM, the pose of the LLP is determined based partly on the readings obtained by angular encoders attached to rotating joints of the LLP. When the LLP is used in a handheld mode detached from an LLP, a different method is used to register the multiple 3D coordinates obtained as the LLP is moved from place to place. In one approach, markers affixed to an object are used to assist in registering the multiple 3D coordinates to a global frame of reference.

Today, when handheld line scanners are used, it is common practice to attach adhesive markers to an object under test. Imaging such markers with a stereo camera provides a way to register 3D coordinates as the handheld scanner is moved from point to point. In the past, the projected lines of light and the markers on an object have been imaged by cameras in the handheld line scanner but processed by an external computer to determine 3D coordinates of points on the object. This approach results in relatively lengthy delays before 3D coordinate data is fully processed and available for inspection.

Furthermore, it is common practice in handheld line scanners today to speed processing by reducing resolution—for example, by meshing data in a coarse grid. The approach has the disadvantage of eliminating fine features in the determined 3D coordinates of the scanned objects.

Other difficulties in using handheld laser scanners comes from range limitations often imposed by the maximum length electrical cables that may be used, especially when power is to be provided to the handheld laser scanner over the electrical cable.

Another difficulty faced by line scanners today is excessive noise resulting from speckle. There is a need to reduce speckle contrast, thereby improving the accuracy of 3D coordinates determined by the line scanners.

Accordingly, while existing handheld line scanners are suitable for their intended purposes there remains a need for improvement, particularly in providing a handheld line scanner having the features described herein.

BRIEF DESCRIPTION

According to a further aspect of the present disclosure, a system includes: a first light source operable to emit a beam of light; an electrical modulator operable to impart a time-varying modulation on the beam of light; a beam-shaping system operable to shape the beam of light and to project the shaped beam of light onto an object; an image sensor operable to capture the beam of light reflected from the object; and one or more processors operable to determine three-dimensional (3D) coordinates of points on the object based at least in part on the reflected beam of light captured by the image sensor.

According to a further aspect of the present disclosure, a system comprising: a light source operable to emit a beam of light; a vertical-cavity surface-emitting laser (VCSEL) array operable to emit a beam of light; a beam-shaping system operable to shape the beam of light and to project the shaped beam of light onto an object; an image sensor operable to capture the beam of light reflected from the object; and one or more processors operable to determine three-dimensional (3D) coordinates of points on the object based at least in part on the reflected beam of light captured by the image sensor.

According to a further aspect of the present disclosure, a system includes: a superluminescent light source operable to emit a beam of light; a beam-shaping system operable to shape the beam of light and to project the shaped beam of light onto an object; an image sensor operable to capture the beam of light reflected from the object; and one or more processors operable to determine three-dimensional (3D) coordinates of points on the object based at least in part on the reflected beam of light captured by the image sensor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 13B illustrates a light pattern emitted by a handheld scanner in a first mode of operation according to an embodiment of the present disclosure;

FIGS. 13C, 13D illustrate light patterns emitted by the handheld scanner in a second mode of operation according to an embodiment of the present disclosure;

FIG. 13G is a schematic representation of a photogrammetry camera with possible connections to optional accessory elements including a wearable computer, a desktop computer, and a mobile display according to an embodiment of the present disclosure;

The detailed description explains embodiments of the disclosure, together with advantages and features, by way of example with reference to the drawings.

DETAILED DESCRIPTION

Improvements described herein below include systems and methods that reduce application and removal of adhesive markers. Another improvement is in providing ways to move handheld scanners and photogrammetric cameras for measurement of large objects without being constrained by wires. Further improvements include methods to obtain 3D coordinates from high-dynamic range (HDR) images with reduced intermediate computations that slow measurements.

Figure 1:
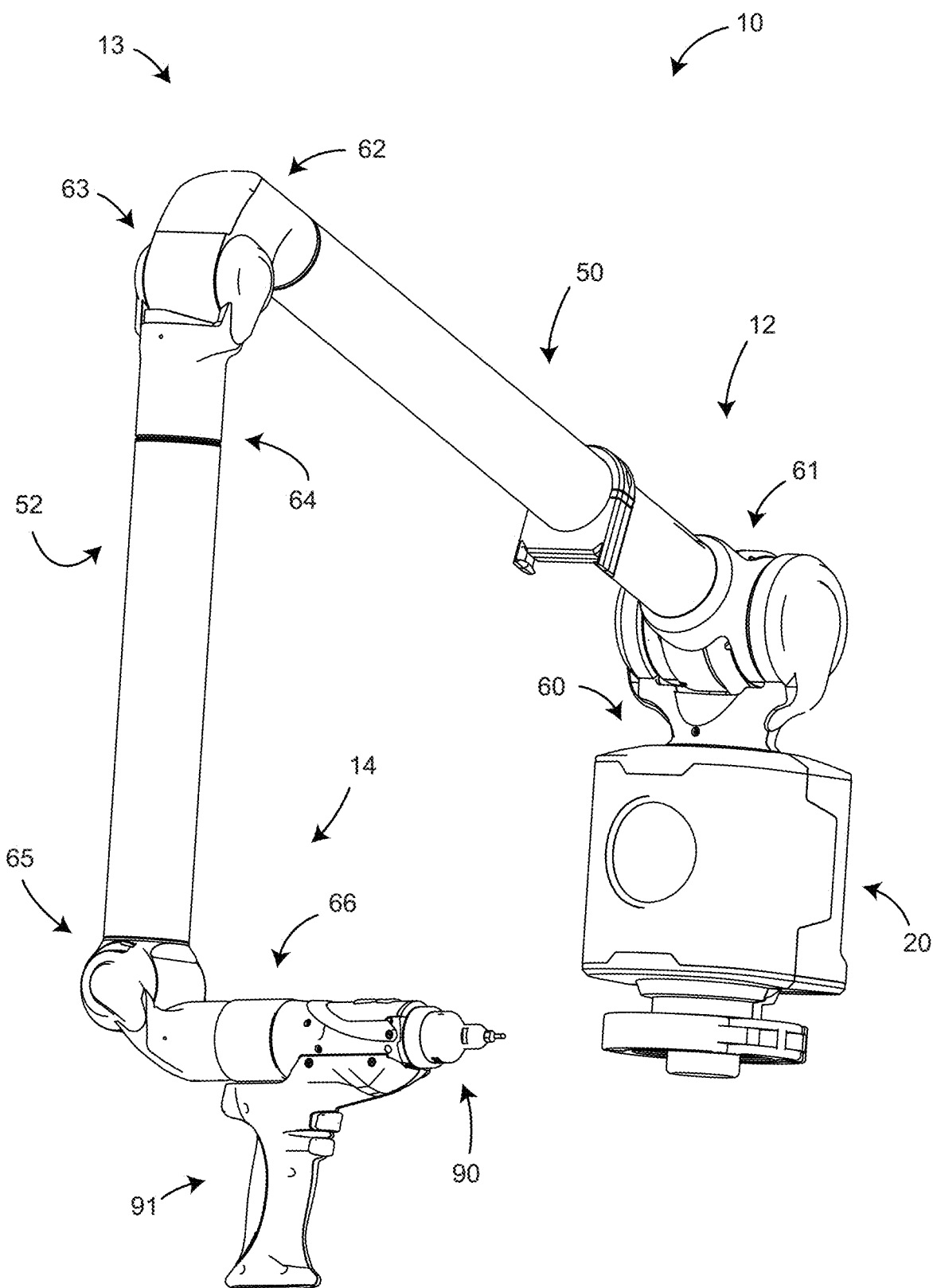
FIG. 1 is an isometric view of a portable AACMM according to an embodiment of the present disclosure.

FIG. 1 illustrates, in isometric view, an articulated arm coordinate measurement machine (AACMM) 10 according to various embodiments of the present disclosure, the AACMM being one type of coordinate measuring machine. In an embodiment, a first segment 50 and a second segment 52 are connected to a base 20 on one end and a measurement device on the other end. In an embodiment, the measurement device is a tactile-probe assembly 90.

In an embodiment illustrated in FIG. 1, the AACMM 10 comprises includes seven rotational elements; hence the AACMM 10 is referred to as a seven-axis AACMM. In other embodiments, the AACMM 10 is a six-axis AACMM. The seven-axis AACMM 10 of FIG. 1 includes first-axis assembly 60, second-axis assembly 61, third-axis assembly 62, fourth-axis assembly 63, fifth-axis assembly 64, sixth-axis assembly 65, and seventh-axis assembly 66. In an embodiment, a tactile-probe probe assembly 90 and a handle 91 are attached to the seventh-axis assembly. Each of the axis assemblies may provide either a swivel rotation or a hinge rotation. In the embodiment illustrated in FIG. 1, the first-axis assembly 60 provides a swivel rotation about an axis aligned to a mounting direction of the base 20. In an embodiment, the second-axis assembly 61 provides a hinge rotation about an axis perpendicular to the first segment 50. The combination of the first-axis assembly 60 and the second-axis assembly 61 is sometimes colloquially referred to as a shoulder 12 since in some embodiments the possible motions of the shoulder 12 of the AACMM 10 resemble the motions possible with a human shoulder.

In the embodiment illustrated in FIG. 1, the third-axis assembly 62 provides a swivel rotation about an axis aligned to the first segment 50. The fourth-axis assembly 63 provides a hinge rotation about an axis perpendicular to second segment 52. The fifth-axis assembly 64 provides a swivel rotation about an axis aligned to the second segment 52. The combination of the third-axis assembly 62, the fourth-axis assembly 63, and the fifth-axis assembly 64 is sometimes colloquially referred to as an elbow 13 since in some embodiments the possible motions of the elbow 13 of the AACMM 10 resemble the motions possible with a human elbow.

In the embodiment illustrated in FIG. 1, the sixth-axis assembly provides a hinge rotation about an axis perpendicular to the second segment 52. In an embodiment, the AACMM 10 further comprises a seventh-axis assembly, which provides a swivel rotation of probe assemblies (e.g., probe 90) attached to the seventh axis. The sixth-axis assembly 65, or the combination of the sixth-axis assembly 65 and the seventh-axis assembly 66, is sometimes colloquially referred to as a wrist 14 of the AACMM 10. The wrist 14 is so named because in some embodiments it provides motions like those possible with a human wrist. The combination of the shoulder 12, first segment 50, elbow 13, second segment 52, and wrist 14 resembles in many ways a human arm from human shoulder to human wrist. In some embodiments, the number of axis assemblies associated with each of the shoulder, elbow, and wrist differ from the number shown in FIG. 1. It is possible, for example, to move the third-axis assembly 62 from the elbow 13 to the shoulder 12, thereby increasing the number of axis assemblies in the shoulder to three and reducing the number of axis assemblies in the wrist to two. Other axis combinations are also possible.

Figure 2:
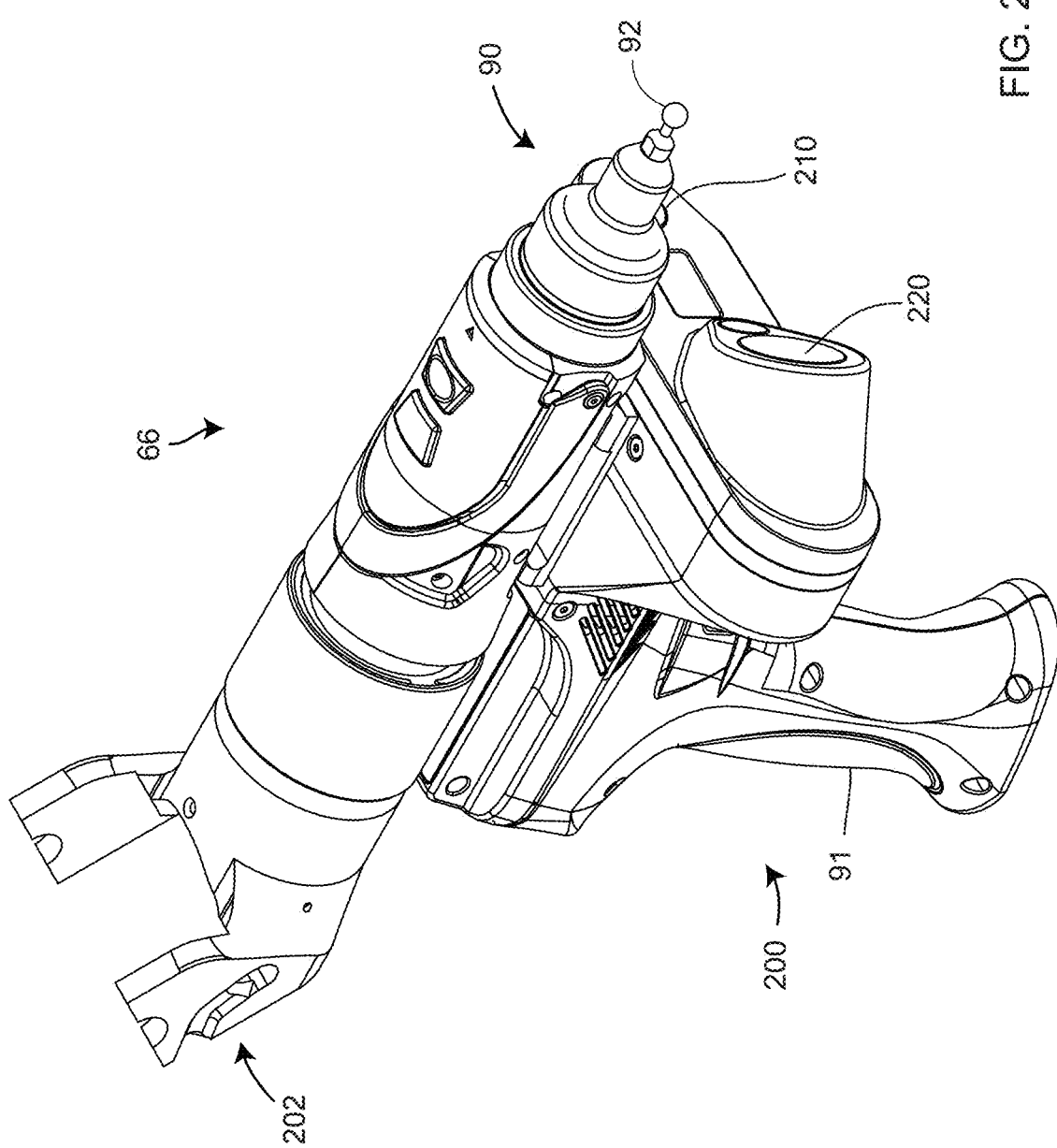
FIG. 2 is an isometric view of an LLP affixed to the end of an AACMM according to an embodiment of the present disclosure.

FIG. 2 shows an isometric view of an LLP 200 coupled to the seventh-axis assembly 66. The LLP 200 includes the camera 220 and the projector 210. In an embodiment, the LLP 200 further includes the handle 91. The seventh-axis assembly 66 includes the seventh-axis housing/yoke 202. Attached to the seventh-axis assembly 66 is tactile-probe assembly 90, which includes the probe tip 92.

Figure 3:
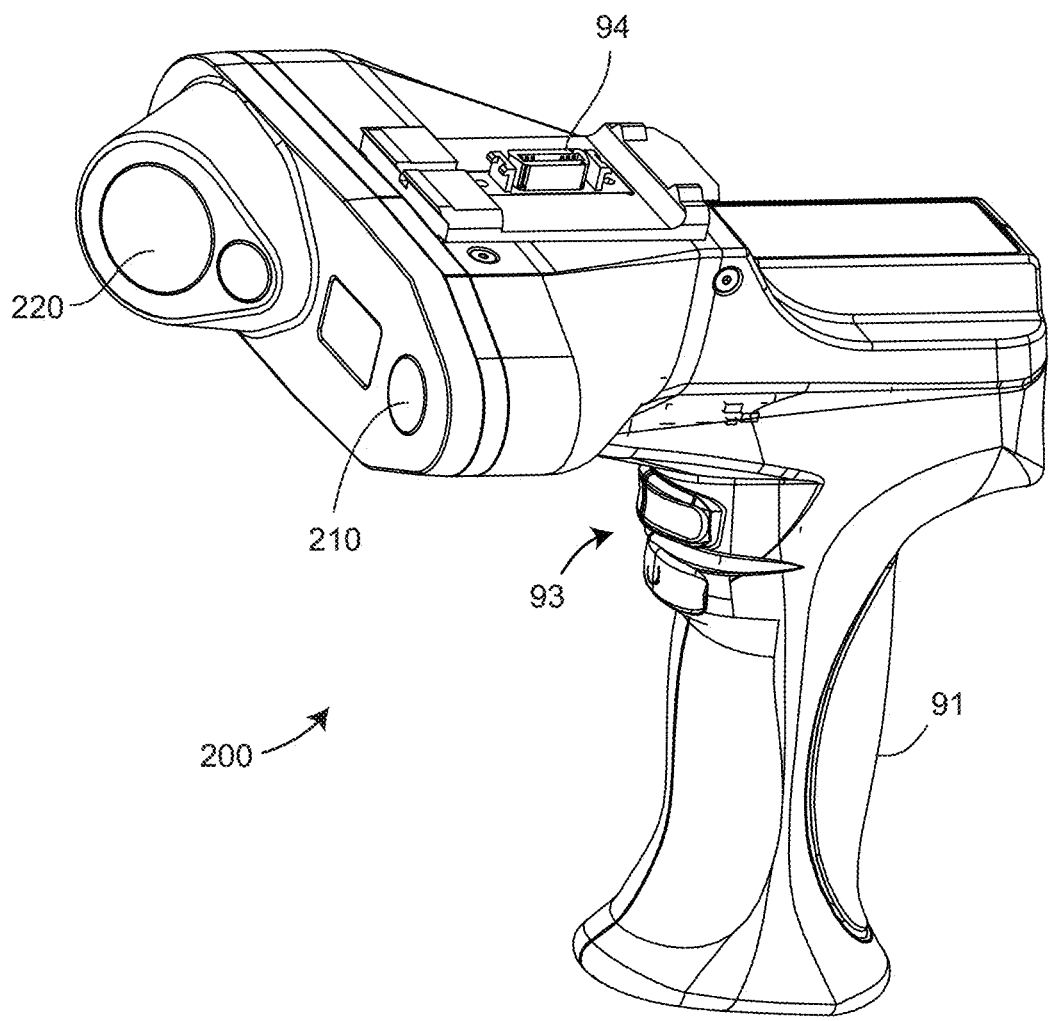
FIG. 3 is an isometric view of an LLP detached from the AACMM according to an embodiment of the present disclosure.

In FIG. 3, the handle 91 includes wires that send electrical signals from handle buttons 93 through the handle-to-arm connector 94. In an embodiment, high-speed signals obtained from a camera 220 of the LLP 200 pass through the handle-to-arm connector 94 to further within the AACMM. In an embodiment, the LLP 200 includes the projector 210, which is separated by a baseline distance from the camera 220. A processor within the system performs a triangulation calculation to determine 3D coordinates of points illuminated by a line of light or other features or targets seen on the object.

Figure 4:
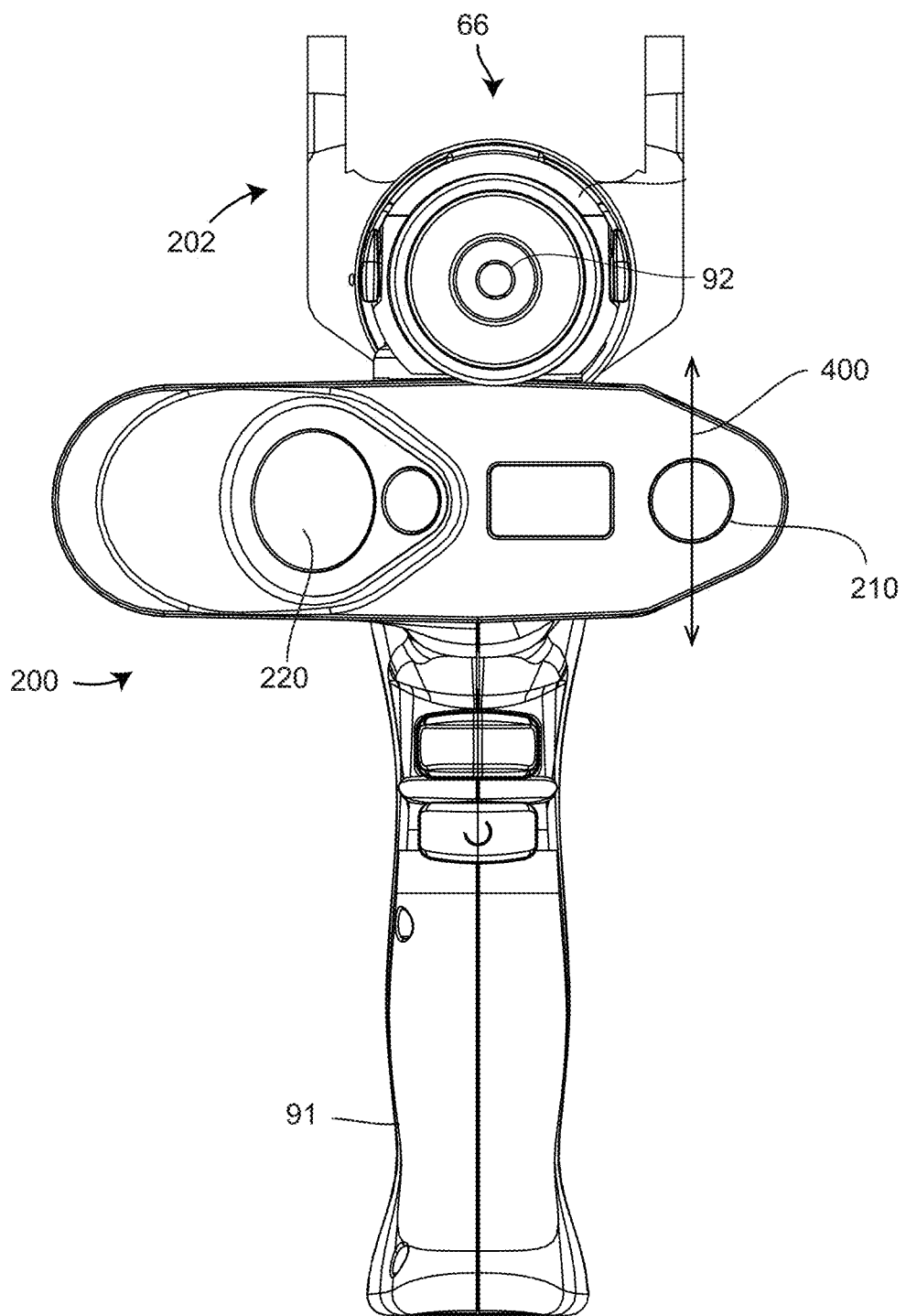
FIG. 4 is a front view of an LLP affixed to the end of an AACMM according to an embodiment of the present disclosure.

FIG. 4 shows the line 400 defining a plane of the beam of light emitted by the projector 210 according to an embodiment. As seen in the front view of FIG. 4, the beam resides in a vertical plane. From a side view, however, the beam of light 400 is seen to be expanding as it moves away from the LLP 200.

Figure 5:
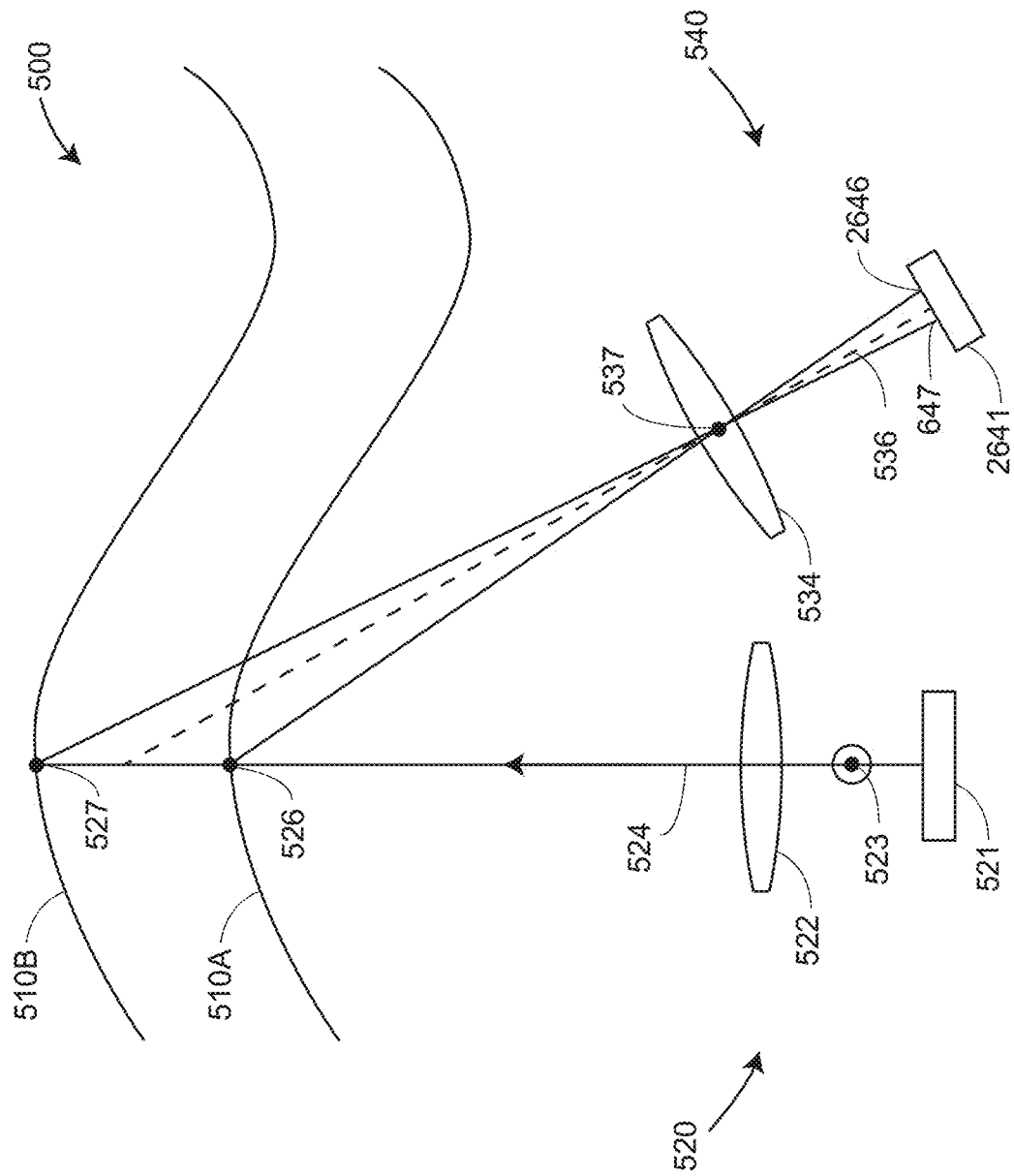
FIG. 5 is a schematic representation of the LLP emitting a line of light to illustrate the principle of triangulation according to an embodiment of the present disclosure.

FIG. 5 shows a schematic illustration of elements of an LLP 500, including a projector 520 and a camera 540. FIG. 5 is a schematic illustration of the LLP 200 when viewed from the top with the LLP 500 looking toward object surfaces 510A, 510B. Because of the change in viewpoint, the camera 220 is to the left of the projector 210 in FIG. 4, while the equivalent camera 540 is to the right of the projector 520 in FIG. 4 in the changed viewpoint. The projector 520 includes a source pattern of light 521 and a projector lens 522. The projector lens 522 includes a projector perspective center and a projector optical axis that passes through the projector perspective center. In the exemplary system of FIG. 5, a central ray 524 of the beam of light coincides with the projector optical axis. The camera 540 includes a camera lens 534 and a photosensitive array 2641. The camera lens 534 has a camera lens optical axis 536 that passes through a camera lens perspective center 537. In the exemplary LLP 500, the camera lens optical axis 536 and the projector optical axis are both perpendicular to a plane that encompasses the line of light 523 projected by the source pattern of light 521. In other words, the plane that encompasses all the lines of light 523 is in the direction perpendicular to the plane of the paper of FIG. 5. The line of light 523 strikes an object surface, which at a first distance from the projector is object surface 510A and at a second distance from the projector is object surface 510B. The line of light 523 intersects the object surface 510A (in the plane of the paper) at a point 526, and it intersects the object surface 510B (in the plane of the paper) at a point 527. For the case of the intersection point 526, a ray of light travels from the point 526 through the camera lens perspective center 537 to intersect the photosensitive array 2641 at an image point 2646. For the case of the intersection point 527, a ray of light travels from the point 527 through the camera lens perspective center 537 to intersect the photosensitive array 2641 at an image point 647. By noting the position of the intersection point relative to the position of the camera lens optical axis 536, the distance from the camera (and projector) to the object surface can be determined using the principles of triangulation, which typically rely on the "baseline" distance between the perspective centers of the projector 520 and the camera 540. The distance from the projector to other points projected by the line of light 523 onto the object, that is points on the line of light that do not lie in the plane of the paper of FIG. 5, may likewise be found using the principles of triangulation.

Figure 6:
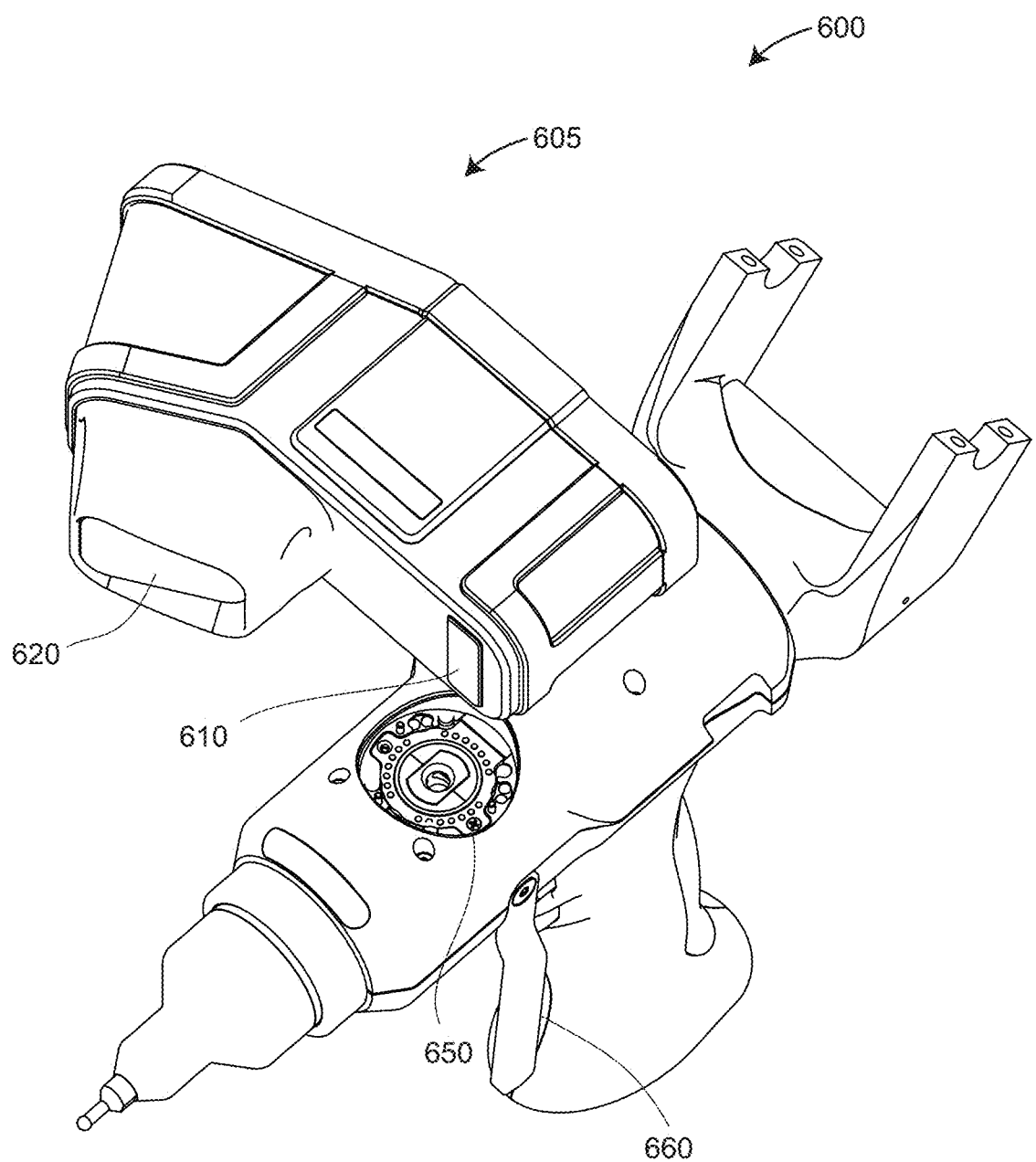
FIG. 6 is an exploded isometric view of an LLP affixed to the end of an AACMM according to an embodiment of the present disclosure.
Figure 7:
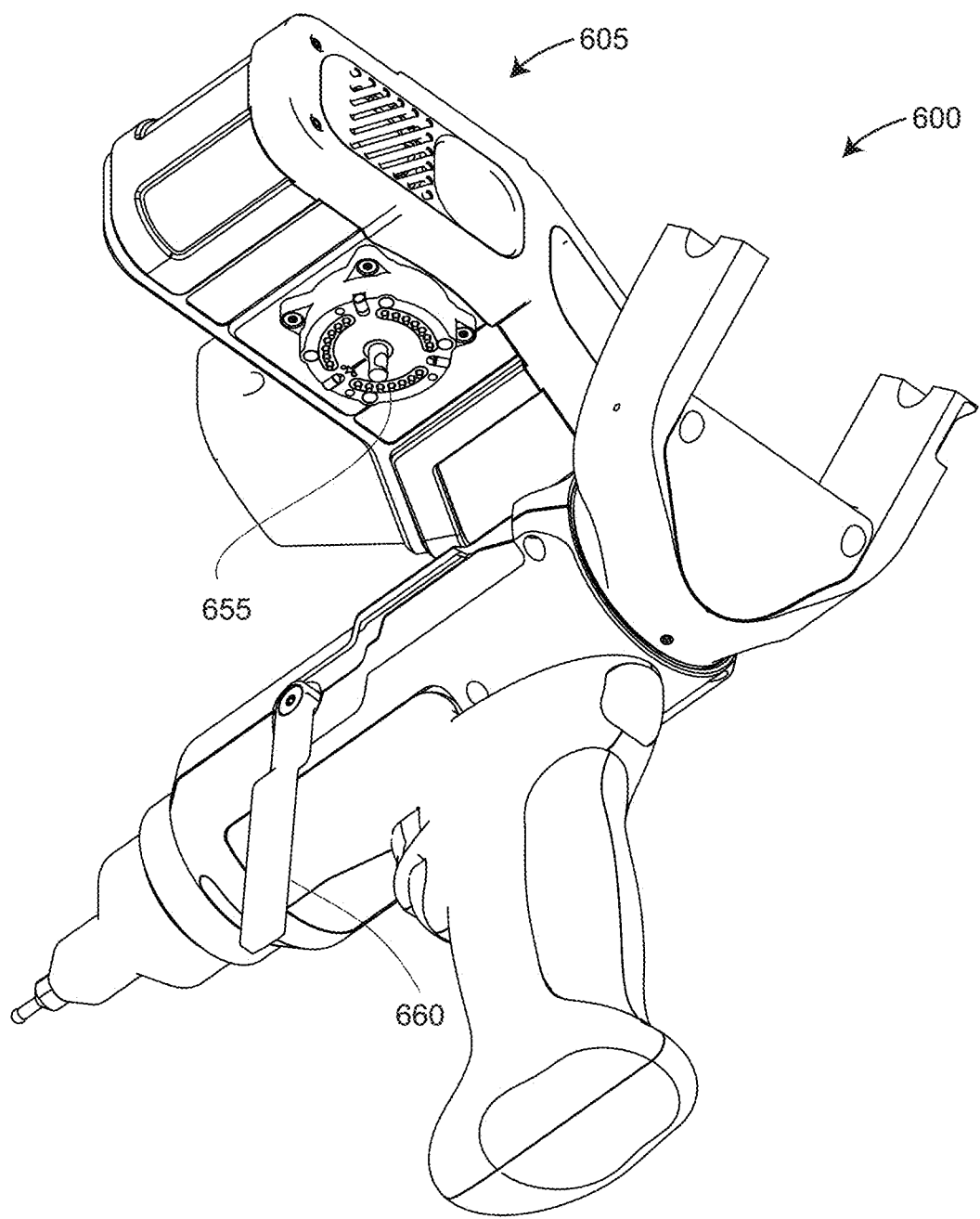
FIG. 7 is a second exploded isometric view of the LLP affixed to the end of the AACMM according to an embodiment of the present disclosure.

In the embodiment of FIGS. 6, 7, the end assembly 600 is coupled to an LLP 605 by a first accessory interface 650 and a second accessory interface 655. In an embodiment, the latch arm 660 is rotated to allow the coupling assembly 650, 655 to lock the LLP 605 in place, thereby connecting the LLP 605 to the end assembly 600 both electrically and mechanically. The LLP 605 includes a projector 610 and a camera 620.

Figure 8:
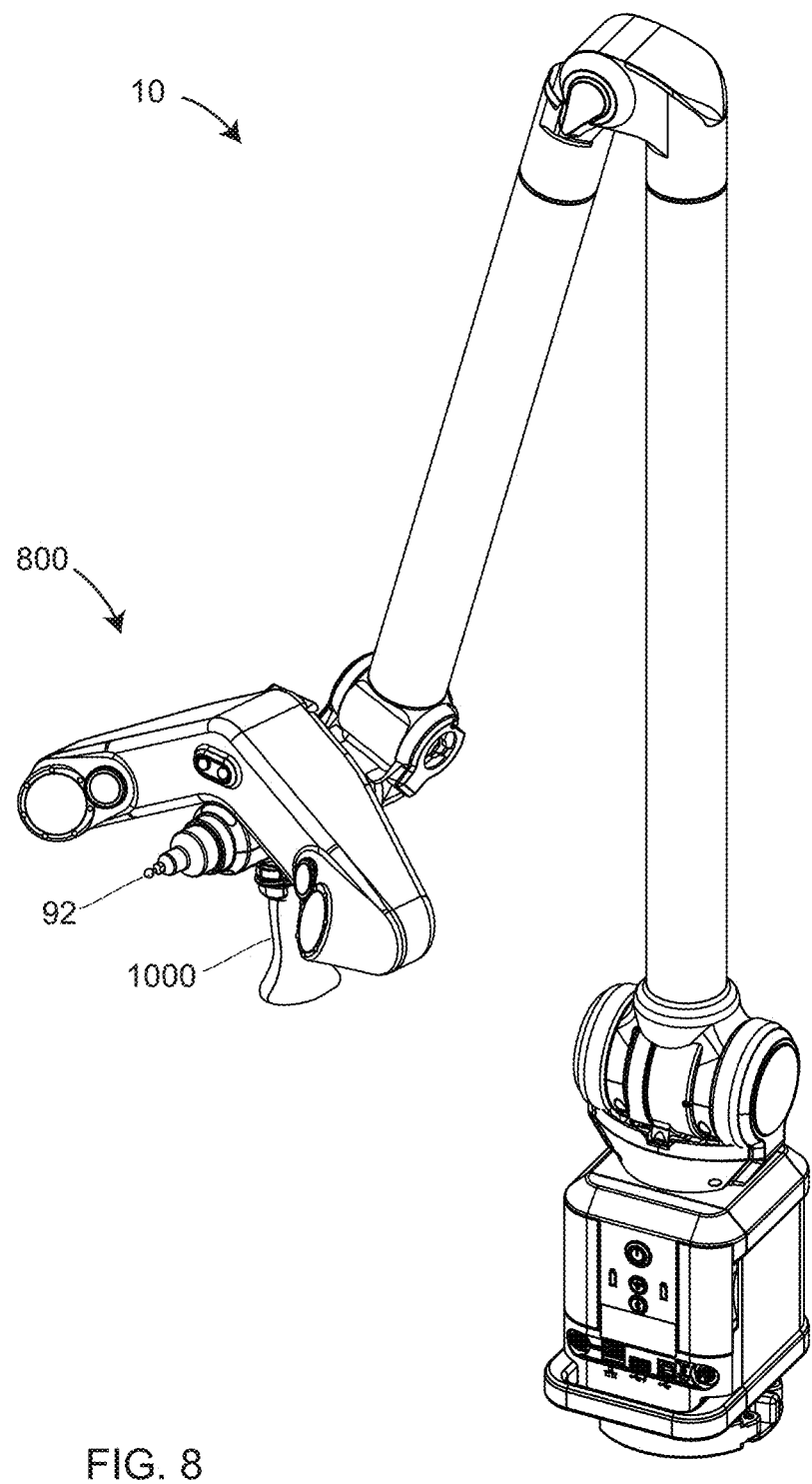
FIG. 8 is an isometric view of a removable LLP affixed to an AACMM according to an embodiment of the present disclosure.
Figure 9:
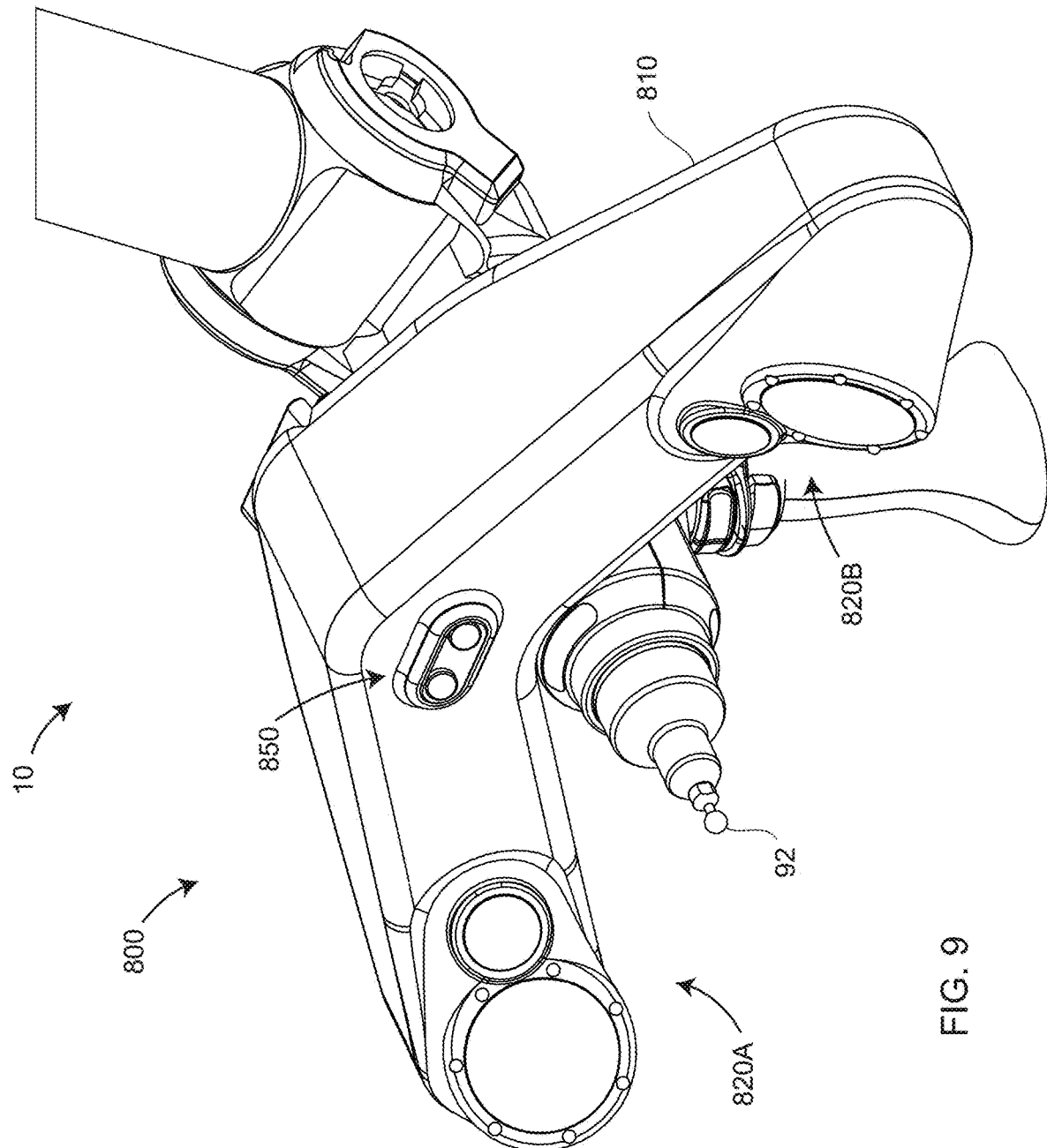
FIG. 9 is a close-up isometric view of the removable LLP and the end of the AACMM according to an embodiment of the present disclosure.
Figure 10:
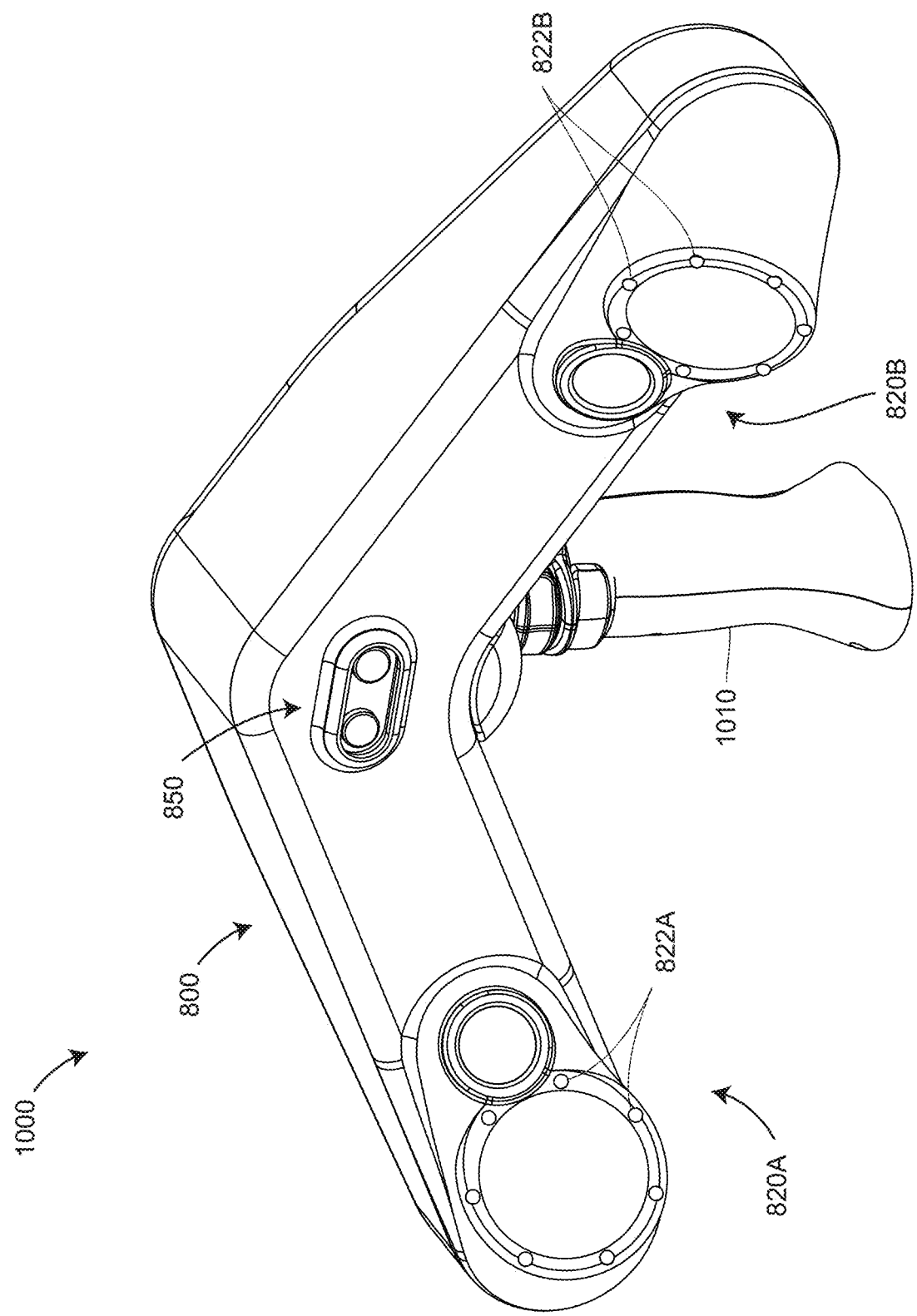
FIG. 10 is an isometric view of a handheld LLP according to an embodiment of the present disclosure.

In an embodiment, an accessory noncontact 3D measuring device 800 may be attached to the AACMM 10 as illustrated in FIGS. 8, 9 or detached from the AACMM as illustrated in FIG. 10. In FIG. 8, the noncontact 3D measuring device 800 is attached to the AACMM 10, which further includes a probe tip 92 for contact 3D measurement. In an embodiment, the device 800 is attached to the first accessory interface 650. FIG. 9 shows elements in the device 800, including device body 810, first camera 820A, second camera 820B, and projector assembly 850. In an embodiment, the projector assembly includes two illuminators that project planes of laser light.

FIG. 10 shows the noncontact 3D measuring device, such as a line scanner 1000, detached from the AACMM 10. The noncontact 3D measuring device 800 includes the cameras 820A, 820B, and projector assembly 850 described in FIGS. 8, 9. It further includes a handle 1010 and optional light-emitting diodes (LEDs) 822A, 822B.

Figure 11:
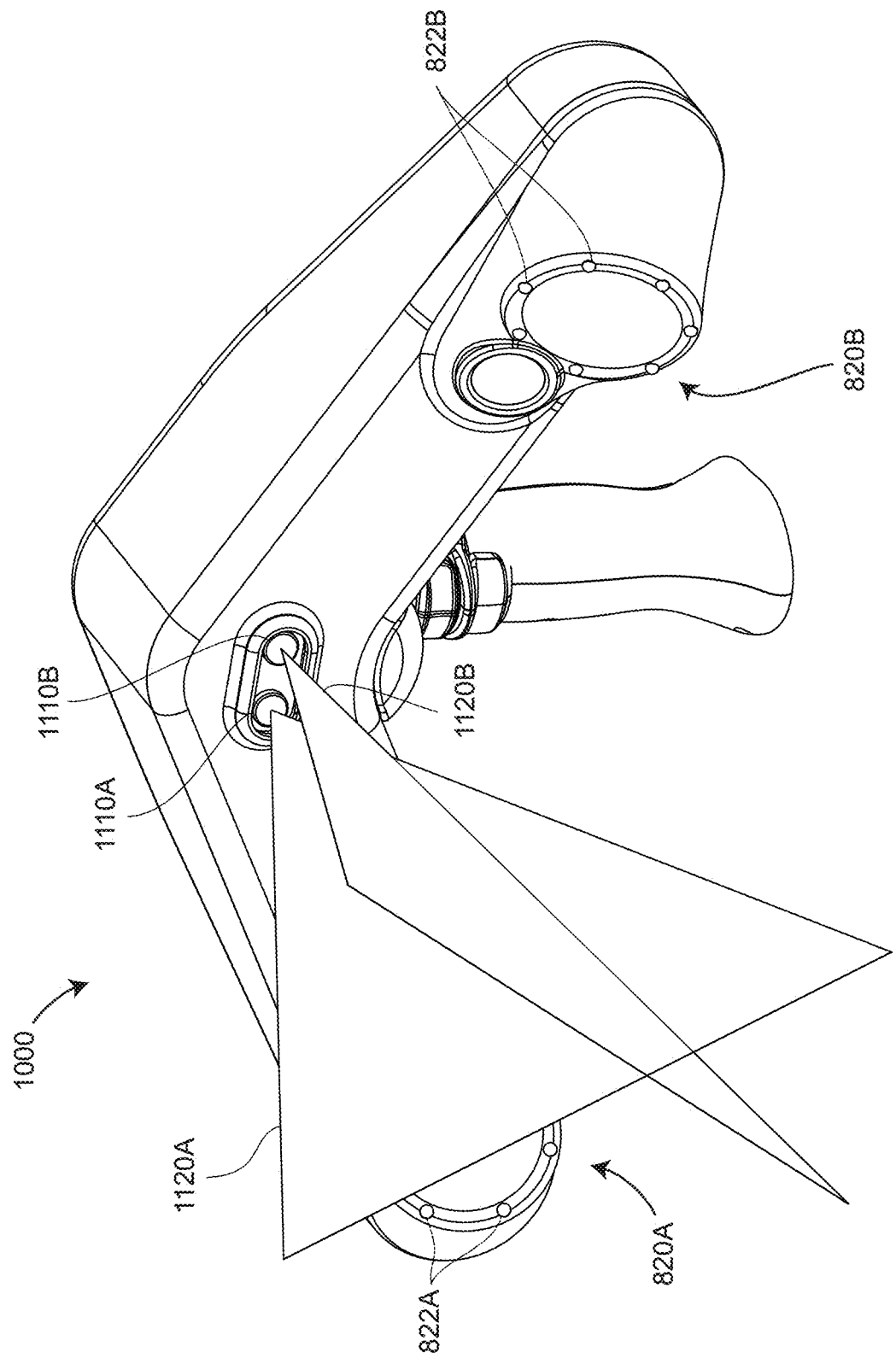
FIG. 11 is an isometric view of the handheld LLP, further showing two emitted planes of light, according to an embodiment of the present disclosure.

FIG. 11 shows the noncontact 3D measuring device 1000 in a mode of operation in which a plane of laser light is emitted from each of light sources 1110A, 1110B. In an embodiment, each of the light sources 1110A, 1110B emits light at a different wavelength. In an embodiment, the camera 820A has an optical coating that passes the wavelength of the light 1110A and blocks the wavelength of the light 1110B. In contrast, the camera 820B has an optical coating that passes the wavelength of the light 1110B and blocks the wavelength of the light 1110A. In an embodiment, both cameras 820A, 820B pass the wavelengths emitted by the LEDs 822A, 822B so that markers illuminated by the LEDs 822A, 822B are visible to both cameras.

Figure 12:
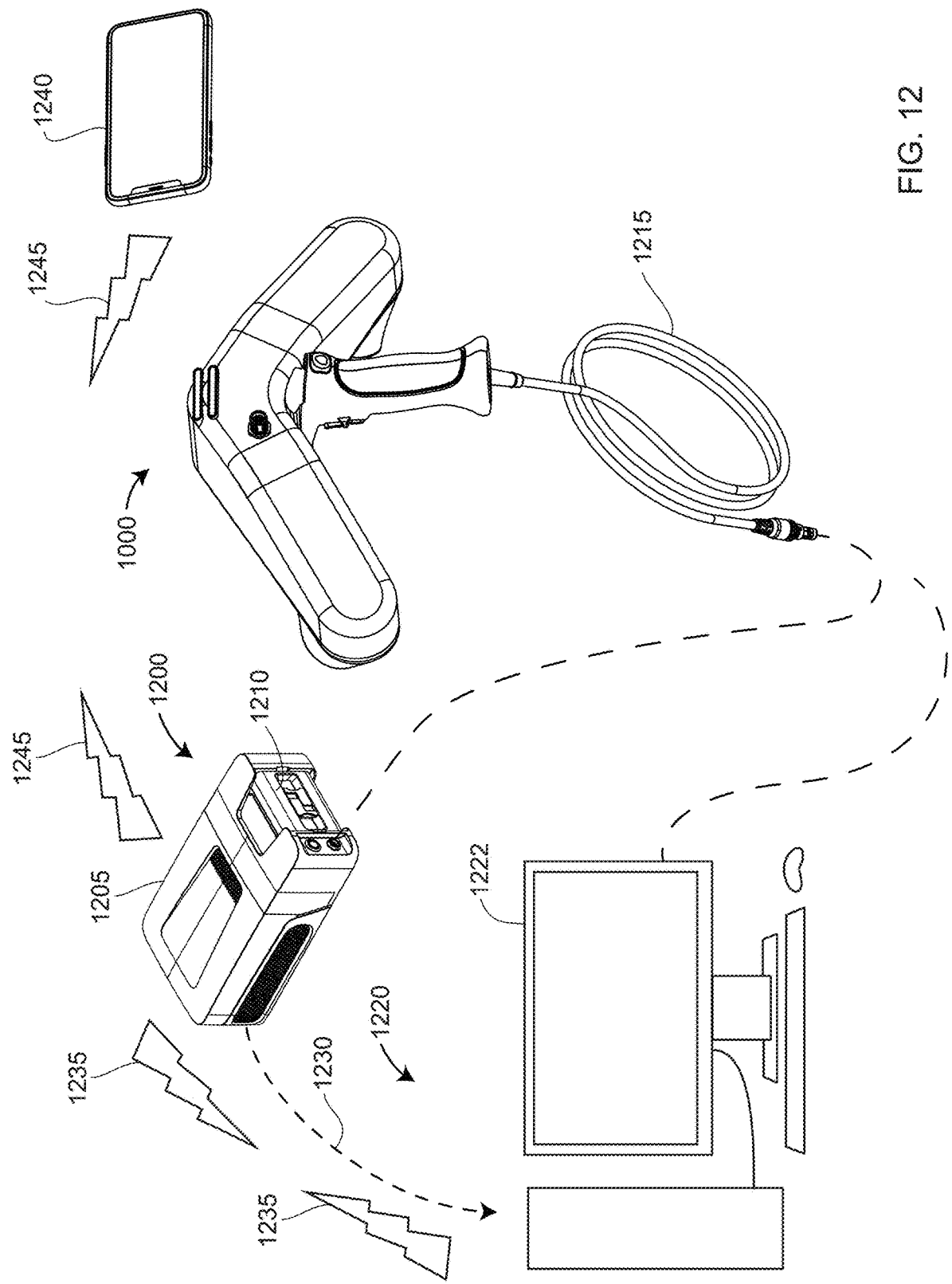
FIG. 12 is a schematic representation of a handheld LLP showing possible connections to optional accessory elements including a wearable computer, a desktop computer, and mobile display according to an embodiment of the present disclosure.

FIG. 12 shows several possible accessories that may be used with the 3D measuring device 1000. In an embodiment, the 3D measuring device attaches to a wearable unit 1200 that includes a computing unit 1205 and a battery 1210. In an embodiment, the battery 1210 is rechargeable and removable. In an embodiment, the wearable unit receives a signal over a USB or Ethernet cable 1215. Ethernet is a family of computer networking technologies first standardized in 1985 as IEEE 802.3. Ethernet that supports 1 gigabit per second is often referred to as Gigabit Ethernet. Higher speed Ethernet versions with multi-gigabit bandwidth such as 2.5G, 5G, and 10G are becoming increasingly common. In embodiments, the cable 1215 carries one of Gigabit Ethernet, 2.5G, 5G, and 10G. First released in 1996, the USB standard is maintained by the USB Implementers Forum. There are several versions of USB from the initial USB 1.0 that operates at 1.2 Mbps to USB4 that operates at 40 Gbps, with intermediate versions having intermediate data rates. Data may be sent from the wearable unit 1200 to an external computer 1220, which might be a desktop computer or a computer network. Connection from the wearable unit 1200 may be made through cable 1230, through wireless connection 1235, or through a removable memory storage device. Connection may alternatively be made between the 3D measuring device 1000 and the external computer 1220.

Captured data may be displayed using a mobile display unit 1240. In an embodiment, the mobile display 1240 is magnetically attached to the rear side of the 3D measuring device 1000. The mobile phone may receive power from the 3D measuring device 1000, which in turn may receive power from the battery 1210 or external computer 1220. The mobile display 1240 may communicate with the wearable unit 1200 through wireless connection 1245 or through a cable from the wearable device. Alternatively, captured data may be displayed using a monitor 1222 provided to operate in conjunction with the external computer 1220.

Figure 13A:
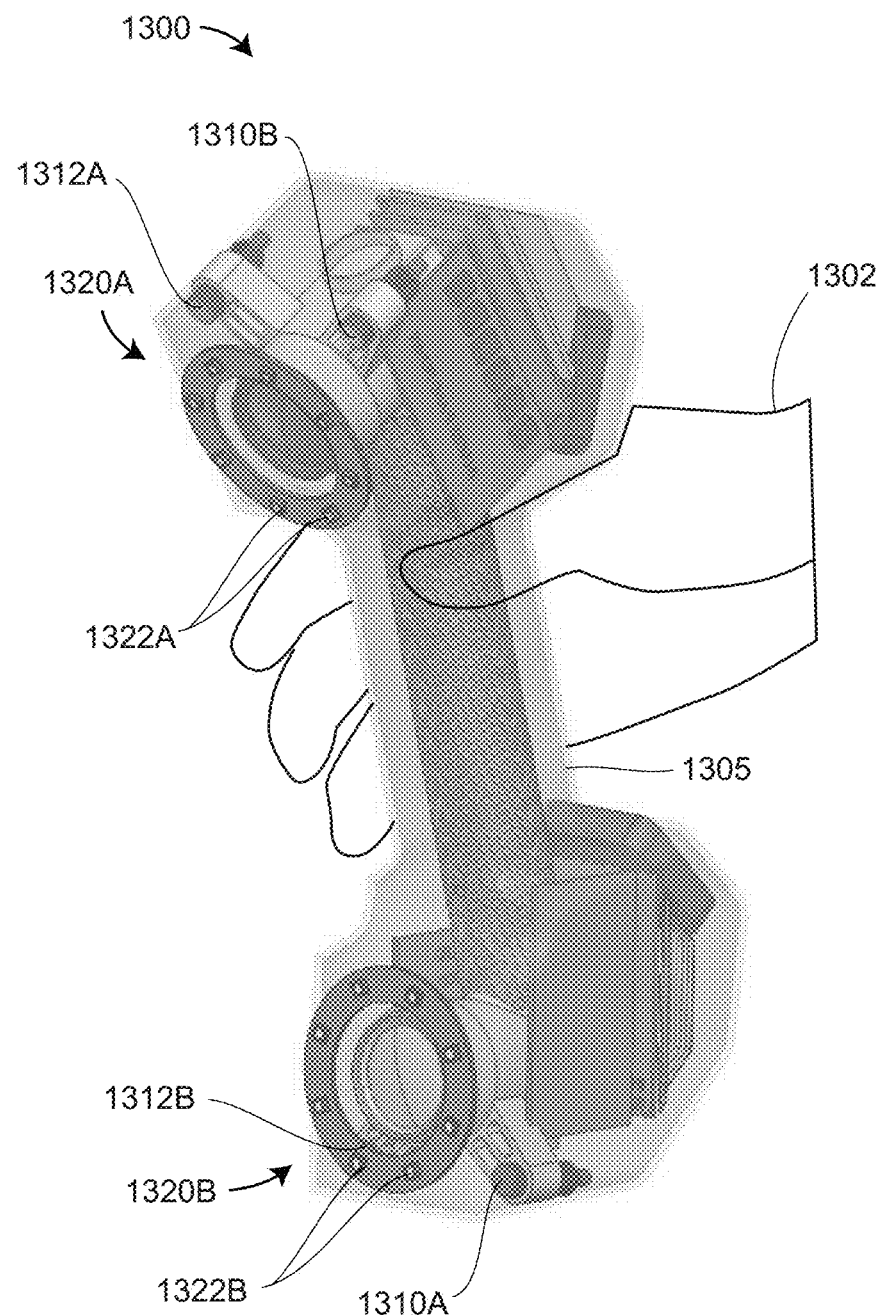
FIG. 13A is an isometric view of a handheld line scanner operable in a target tracking mode and a geometry mode according to an embodiment of the present disclosure.

FIG. 13A shows a handheld 3D measuring device 1300 (e.g., a photogrammetric camera or line scanner) in which a shaft 1305 provides a handle for an operator 1302. The 3D measuring system 1300 illustrated in FIG. 13A may be operated in a target tracking mode or a geometry tracking mode, according to a selection made by the operator. FIG. 13A illustrates features applicable to both modes.

FIGS. 13A, 13B illustrate the target tracking mode. In this mode, light source 1310A emits a plane of light at the first wavelength. This light is captured by the camera 1320A as the line 1330A. At the same time, light source 1310B emits a plane of light at a second wavelength. This light is captured by the camera 1320B as the line 1330B. In an embodiment, the first wavelength is different than the second wavelength. At the same time, LEDs 1322A, 1322B emit light at a different third wavelength to illuminate reflective markers 1330C placed on or near the object under test. The first camera 1320A includes optical elements coated to pass the first and third wavelengths, while the second camera 1320B includes optical elements coated to pass the second and third wavelengths. Hence each of the cameras 1320A, 1320B sees one of the two projected lines of laser light as well as the illuminated reflective markers 1320C. The lines of light imaged by the cameras 1320A, 1320B are processed to determine the 3D coordinates of illuminated points on the object within the frame of reference of the 3D measuring device 1300. The reflective 3D markers 1330C imaged by the cameras 1320A, 1320B are processed to determine the 3D coordinates of the markers 1330C in successive frames. This enables the 3D coordinates determined for the lines 1330A, 1330B to be tracked (registered) over successive frames.

In the geometry tracking mode illustrated in FIG. 13C, light source 1312A emits multiple parallel planes of light 1340 at a fourth wavelength. The fourth wavelength is different than the first wavelength, second wavelength, and third wavelength. The first camera 1320A and the second camera 1320B both include elements coated to pass the fourth wavelength, and hence both cameras 1320A, 1320B see the projected lines 1340A. Because the optical axis of the camera 1320A is more closely aligned to the optical axis of the projector 1312A than to the optical axis of the projector 1312B, the projected lines of light from the projector 1312A will tend to sweep more slowly across the image sensor as the distance to the object changes than will the projected lines of light from the projector 1312B. The difference in these lines of light as seen by the cameras 1320A, 1320B enables the identity of each line to be uniquely determined. The process of identifying which projected lines correspond to which imaged lines is referred to a "disambiguation" of the lines. In an embodiment, a method used for doing this disambiguation is described in Willomitzer et al., "Single-shot three-dimensional sensing with improved data density," in Applied Optics, Jan. 20, 2015, pp 408-417. Further improvement in the geometry tracking mode is possible by further projecting multiple planes of light 1340B with the projector 1312B. In an embodiment, the patterns 1340A, 1340B are alternately projected.

As illustrated in FIGS. 13C, 13D, the projected multiple planes of light appear as lines of light 1340A, 1340B when striking a planar surface. Deviations in the imaged lines of light 1340A, 1340B from perfect straightness indicates that the surface being measured is not perfectly planar. Deviations resulting from edges, dips, or bulges can be detected and correlated from shot to shot to determine the amount and direction of movement in each frame. An advantage of the geometry tracking mode compared to target tracking mode is faster measurements since adhesive markers are not applied or removed.

Figure 13E:
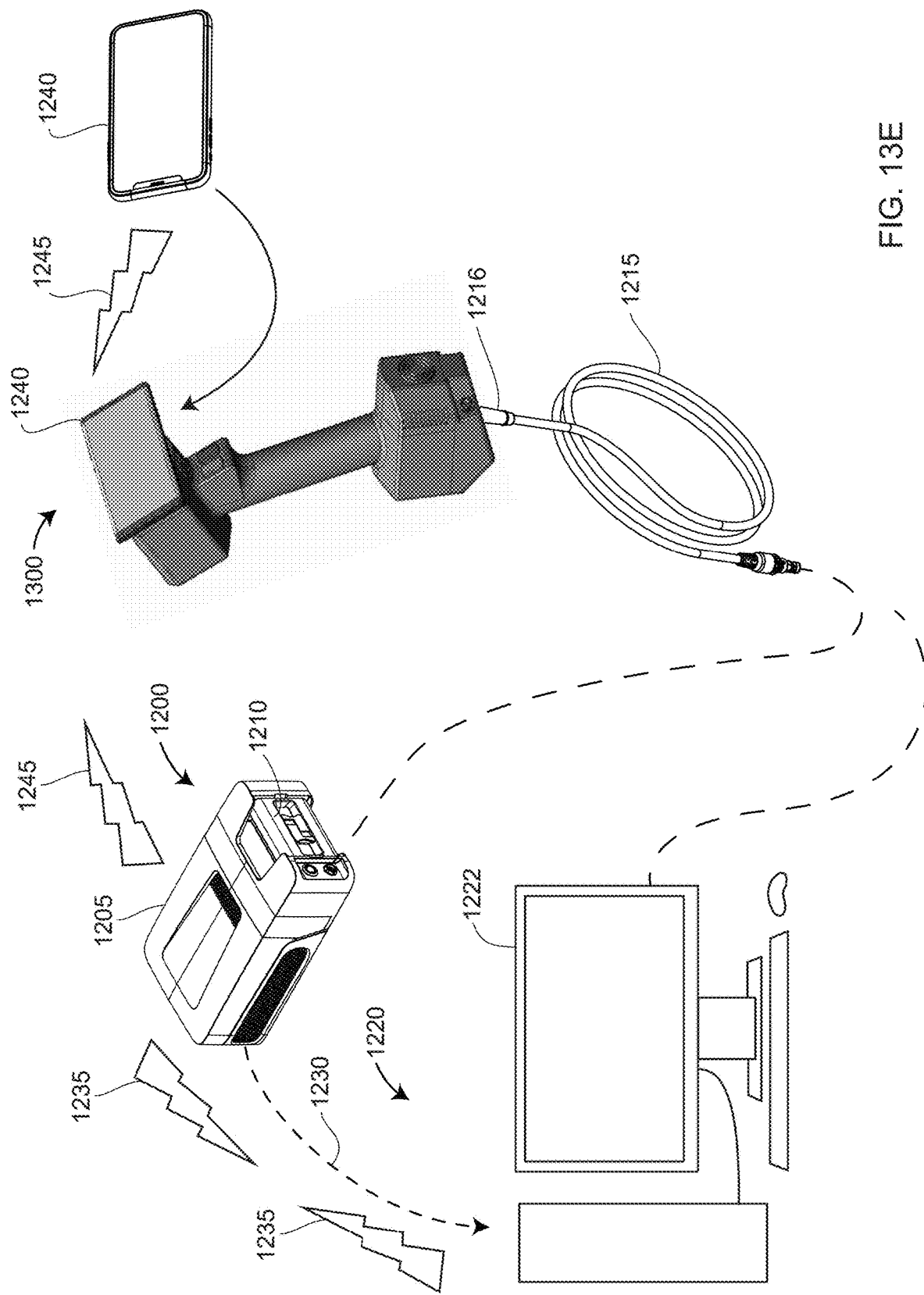
FIG. 13E is a schematic representation of a handheld line scanner operable in a target tracking mode and a geometry mode with possible connections to optional accessory elements including a wearable computer, a desktop computer, and a mobile display according to an embodiment of the present disclosure.

In the embodiment illustrated in FIG. 13E, the photogrammetric camera 1300 is powered by a battery 1210 within a wearable unit 1200. In an embodiment, the power connector 1216 is conveniently disconnected from a handheld scanner such as the scanner 1000, 1300 and plugged into the scanner handle to provide power to the photogrammetric camera. In an embodiment, computing unit 1205 is used to process images obtained by the photogrammetric camera 1300 of target markers affixed on or near the object under test. Computing unit 1205 may also cooperate with an external or networked computer 1220 to process target images. In an embodiment, the mobile display 1240 is used to provide instructions or information on preferred positions and orientations of the photogrammetric camera 1300 in capturing images. In addition, in an embodiment, the mobile display 1240 displays captured data using the mobile display unit 1240. In an embodiment, the mobile display 1240 is magnetically attached to the rear side of the 3D measuring device 1300. The mobile phone may receive power from the 3D measuring device 1300, which in turn may receive power from the battery 1210 or external computer 1220. The mobile display 1240 may communicate with the wearable unit 1200 through wireless connection 1245 or through a cable from the wearable device. Alternatively, captured data may be displayed using a monitor 1222 provided to operate in conjunction with the external computer 1220.

Figure 13F:
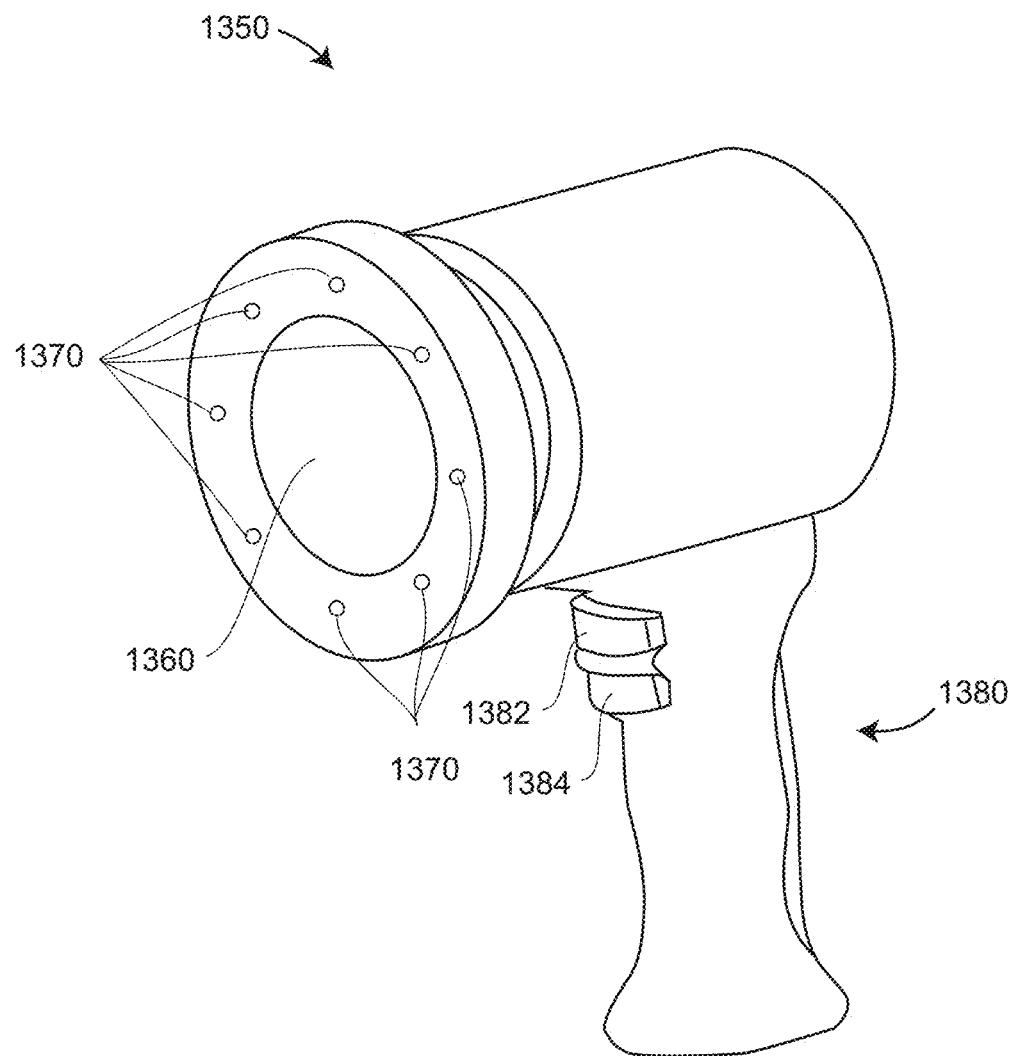
FIG. 13F is an isometric view of a handheld photogrammetry camera according to an embodiment of the present disclosure.

A photogrammetric camera 1350 shown in FIG. 13F may be used in combination with a handheld line scanner such as the scanner 1300. The photogrammetric camera 1350 includes a camera assembly 1360, which include a camera lens, image sensor, and electronics. Surrounding the camera assembly 1360 are a collection of light sources 1370 such as light emitting diodes (LEDs). In an embodiment, the photogrammetric camera further includes a handle 1380 having control buttons 1382, 1384. In an embodiment, the photogrammetric camera is used with scale bars or other scaled objects to provide scale in the captured images. In an embodiment, the light sources 1370 illuminate the object, which may include target reflectors or markers 1330C like those shown in FIG. 13B. Markers 1330C may also be placed on the scale bars. In an embodiment, markers 1330C are placed over a relatively large area on the object. The photogrammetry camera 1350 captures images of the object and scale bars from a variety of positions and perspectives. Software is then used to perform a least-squares fit (or other optimization procedure) to determine the 3D coordinates of the markers in space over the relatively large area of the object. This enables the handheld line scanner 1300, which may measure over a relatively small area at a time, to be accurately registered over a much larger area. If the photogrammetric camera 1350 is used with the scanner 1300 in the geometry tracking mode illustrated in FIGS. 13C, 13D, the photogrammetric camera may be used to measure natural features such as edges or corners to provide registration assistance for a handheld line scanner such as the scanner 1300.

In the embodiment illustrated in FIG. 13F, the photogrammetric camera 1350 is powered by a battery, which may for example be inserted into the handle 1380. In an alternative embodiment illustrated in FIG. 13G, the photogrammetric camera 1350 is powered by a battery 1210 within the wearable unit 1200. In an embodiment, the power connector 1216 is conveniently disconnected from a handheld scanner such as the scanner 1000, 1300 and plugged into the handle 1380 to provide power to the photogrammetric camera. In an embodiment, computing unit 1205 is used to process images obtained by the photogrammetric camera 1350 of target markers affixed on or near the object under test. Computing unit 1205 may also cooperate with an external or networked computer 1220 to process target images. In an embodiment, the mobile display 1240 is used to provide instructions or information on preferred positions and orientations of the photogrammetric camera 1350 in capturing images.

Figure 14:
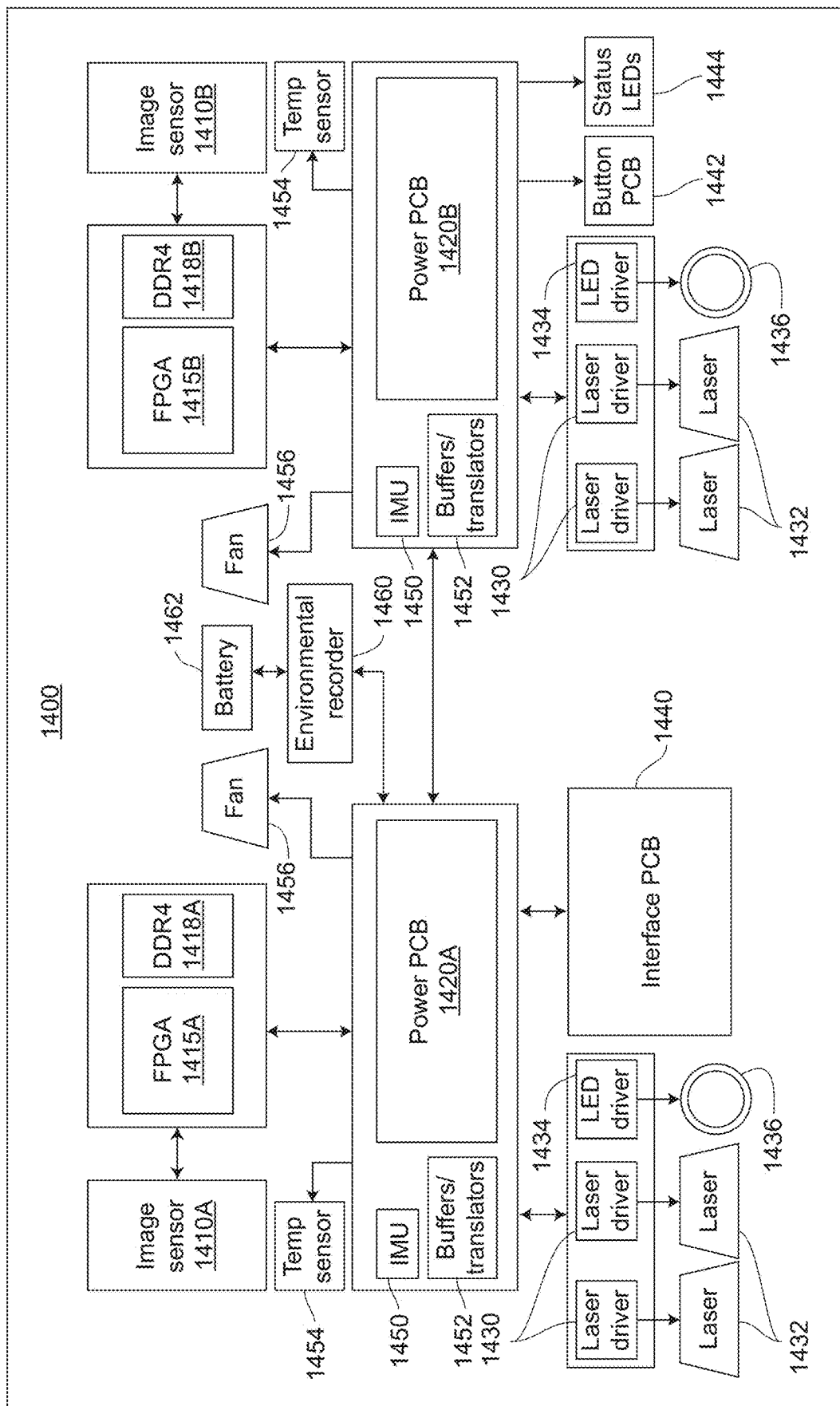
FIG. 14 is a block diagram showing electronics within the handheld portion of the scanning system according to an embodiment of the present disclosure.

FIG. 14 is a block diagram illustrating exemplary electronics 1400 within a handheld line scanner such as the handheld line scanner 1000 or 1300. Processing for images captured by each of the two image sensors 1410A, 1410B within the line scanner is carried out by a corresponding field programmable gate arrays (FPGAs) 1415A, 1415B and double date rate 4 synchronous dynamic random-access memory (DDR4 SDRAM or simply DDR4) 1418A, 1418B. Printed circuit boards (PCBs) 1420A, 1420B provide direct current (DC) electrical power to components in the electronics 1400. For example, voltages may be provided at 0.9, 1.2, 1.8, 2.5, 3.0, 3.3 and 5 volts. Laser drivers 1430 provide current to lasers 1432 or other light sources that emit lines or other patterns of light. LED drivers 1434 provide current to LEDs ring PCBs 1436. Interface PCB 1440 provides an electrical interface to components outside of electronics 1400. The PCBs 1420A, 1420B also provide electrical power to the button PCB 1442, status LEDs 1444, inertial measurement units (IMUs) 1550, buffers/translators 1452, temperature sensors 1454, and fans 1456. An environmental recorder 1460 records environmental events and is supplied electrical power by battery 1462 to record such events even when power from AC power mains is not available to electronics 1400. For example, the environmental recorder may record high-g shocks measured by the IMUs 1450 during shipping.

Figure 15:
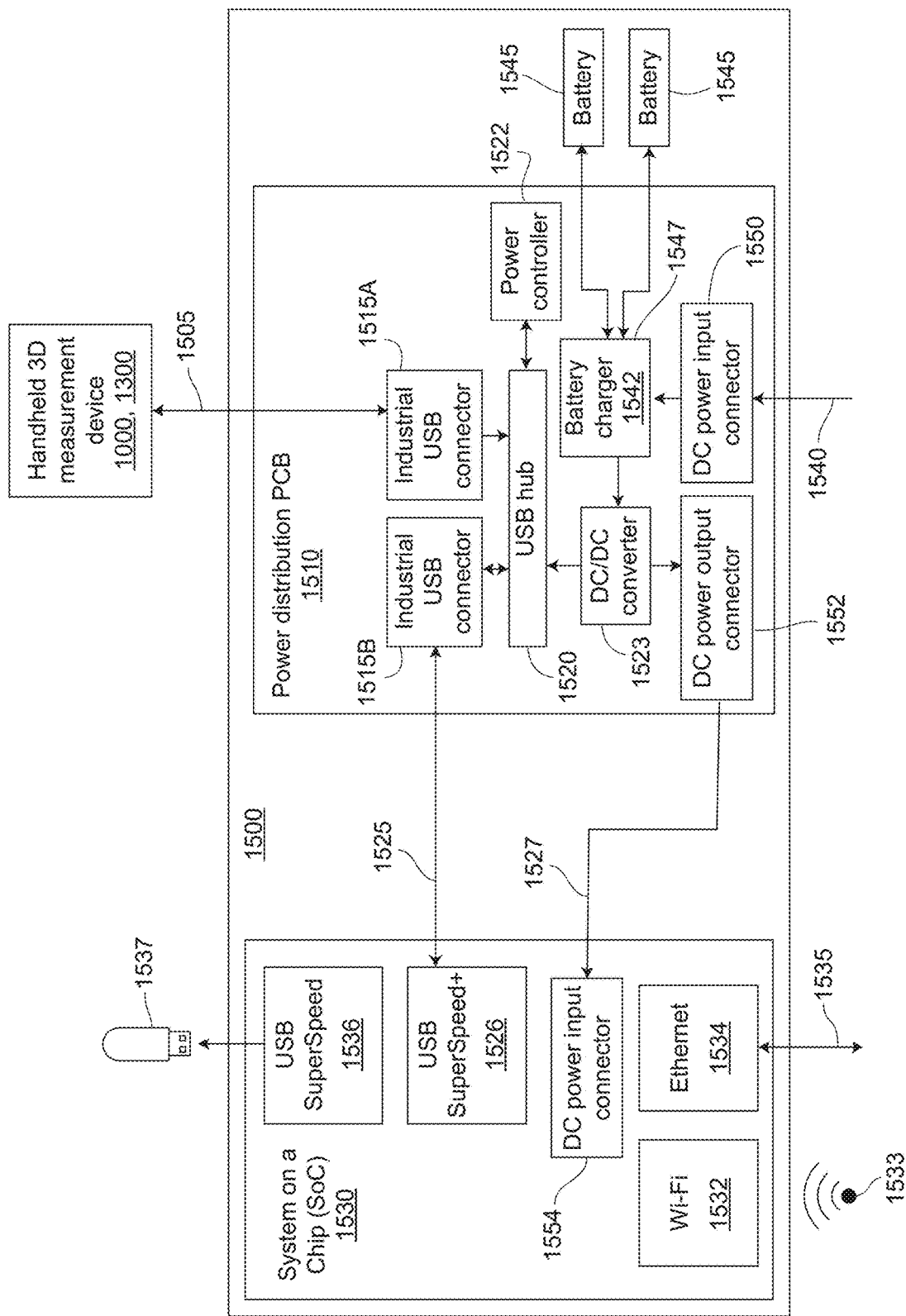
FIG. 15 is a block diagram showing electrical components within a wearable computer and other system components according to an embodiment of the present disclosure.

FIG. 15 shows electronics 1500 within the exemplary wearable unit 1200 (FIG. 12). In an embodiment, a handheld 3D measurement device such as 1000 or 1300 sends data over a USB-C cable 1505, which can transfer data at up to 10 Gbps to the wearable unit 1200. Data arrives at a first industrial USB connector 1515A within a power distribution PCB 1510. The data is transferred to the USB hub 1520, which in an embodiment is a USB 3.2 Gen 2 hub capable of transferring data at 10 Gbps. Electrical power is delivered to the USB hub 1520 from a battery charger 1542 (via DC/DC converter 1523 for example) that may receive electrical power from either a 19-volt DC line 1540 or from either of two batteries 1545. In an embodiment, the batteries 1545 are removable and rechargeable. The battery charger 1542 sends some DC power to the USB hub 1520, which distributes DC power upstream to the handheld unit (such as 1000 or 1300) according to the instructions of the power controller 1522. The battery charger 1542 also sends some DC power downstream through the DC power output connector 1552 through the cable 1527 to the DC power input connector 1554, which distributes power as required in the components of a System on a Chip (SoC) 1530. Data is passed from the USB hub 1520 to a second industrial USB connector 1515B and through a second USB-C cable 1525 to a USB Super-Speed+ port 1526 affixed to the SoC 1530. In an embodiment, the SoC 1530 is an Intel Next Unit of Computing (NUC) device. In an embodiment, the SoC 1530 is interfaced to Wi-Fi 1532, Ethernet 1534, and a USB SuperSpeed flash drive 1537. In an embodiment, Wi-Fi 1532 sends wireless signals 1533 to a mobile phone display 1240. Wi-Fi is a trademark of the non-profit Wi-Fi Alliance. Wi-Fi devices, which are compliant with the IEEE 802.11 standard, are used for local wireless network connectivity applications such as to the mobile display 1240 and external computer 1220. In an embodiment, Ethernet 1534 is a Gigabit Ethernet (GbE) that sends signals at 1 Gbit per second over wires (cables) 1535 to an external computer 1220. Ethernet, which is compliant with the IEEE 802.3, is used for wired network connectivity applications. In an embodiment, scan data is saved on a USB SuperSpeed flash drive 1537 via USB port 1536. The Universal Serial Bus (USB) is an industry standard maintained by the USB Implementer's Forum. USB is designed to provide power as well as data communications. USB-C SuperSpeed+ provides data transfer at 10 Gbps. The battery charger 1542 delivers DC power from the batteries to the battery charger when desired, and also charges the batteries 1545 when power is being supplied by the DC power line 1540.

To improve accuracy of determined 3D coordinates of points measured on an object by a 3D measuring device such as 1000 or 1300, it is desirable to increase the dynamic range of the imaged lines of laser light as much as possible. When dynamic range is large, the 3D measuring device can capture bright reflections without saturation and faint reflections without excessive noise. One method of increasing dynamic range was described in commonly owned U.S. patent application Ser. No. 17/073,923 (hereafter Faro '923) filed on Oct. 19, 2020, the contents of which are incorporated by reference herein. This method uses a photosensitive array having a selectable conversion gain (CG), where CG is defined as the voltage produced per electron (e) in a pixel electron well. For example, a pixel having a CG=130 µV/e produces a 1.3-volt signal in response to 10,000 electrons in its electron well. A CG is said to be selectable when any of two or more CGs can be selected. According to one method described in Faro '000, high and low CGs are alternately selected, and the signal obtained for the preferred CG is chosen.

For the electronics illustrated in FIG. 14, a potential disadvantage of the selectable gain method of Faro '000 is that more computations are required of electronics such as the FPGAs 1415A, 1415B. The added computations result in increased power consumption, increased system weight, and added expense to obtain the desired high dynamic range. In an embodiment described in Faro '000, the gain settings are alternated between high gain and low gain, the pixel values are alternately read out, and one of the two read-out values is selected for each pixel. Using this approach, high dynamic range is achieved without increased power consumption, weight gain, or expense.

Figure 16:
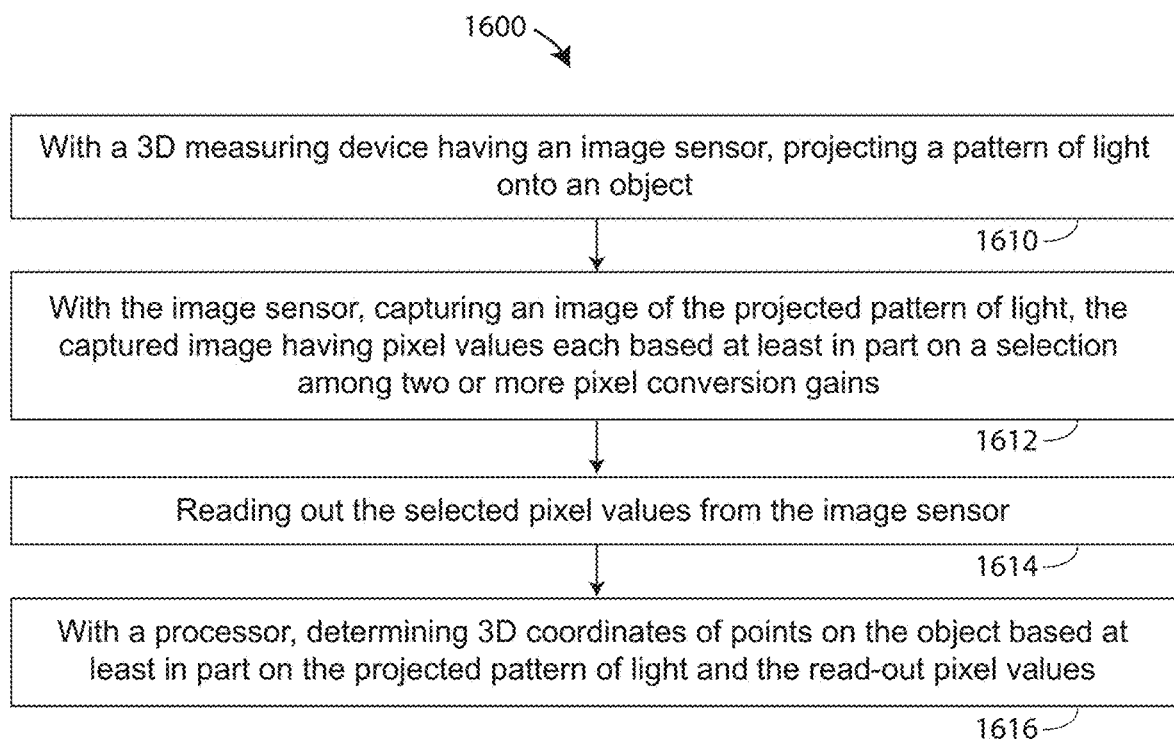
FIG. 16 is a block representation of a method for determining 3D coordinates of points on an object according to an embodiment of the present disclosure.

A method that provides high dynamic range without increasing power consumption, system weight, and expense is illustrated in the method 1600 of FIG. 16. An element 1610 includes, with a 3D measuring device having an image sensor, projecting a pattern of light onto an object. An element 1612 includes, with an image sensor, capturing an image of the projected pattern of light, the captured image having pixel values each based at least in part on a selection among two or more-pixel conversion gains. An element 1614 includes reading out the selected pixel values from the image sensor. An element 1616 includes, with a processor, determining 3D coordinates of points on the object based at least in part on the projected pattern of light and the read-out pixel values.

Figure 17A:
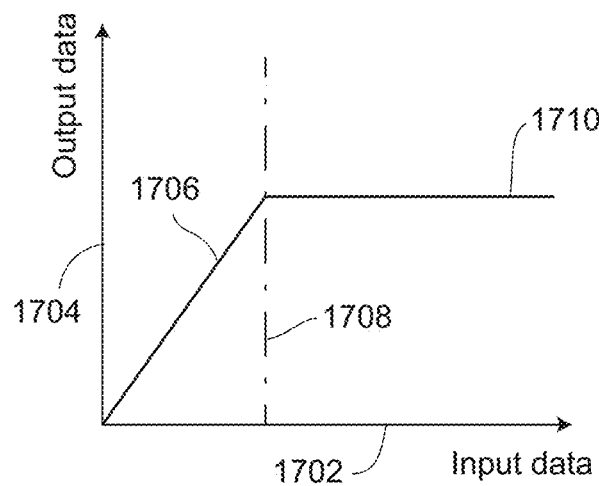
FIGS. 17A, 17B, 17C are plots illustrating the relationship between input data and output data at a pixel of an image sensor for high gain, low-gain, and combined gain modes, respectively, according to an embodiment of the present disclosure.
Figure 17B:
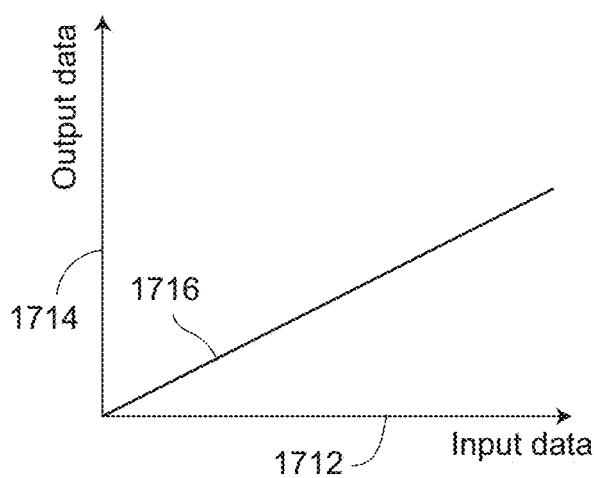
Figure 17C:
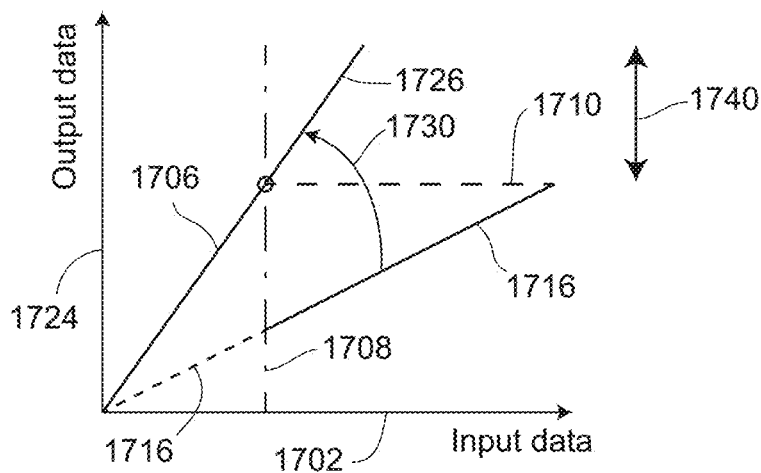

FIGS. 17A, 17B, 17C illustrate an embodiment of the method 1600 illustrated in FIG. 16. In each of FIGS. 17A, 17B, 17C, the horizontal axis 1702 of each graph represents input data, which is to say the electrical signal (for example, in microvolts) generated in response to electrons in the pixel well. As an example of low and high CG modes, the high CG might be $CG_{high}$=130 µV/e while the low CG might be $CG_{low}$=30 µV/e. Corresponding numbers of electrons in a full pixel well might then be 10,000 electrons for the high CG case and 40,000 electrons for the low CG case. Corresponding noise levels might be 2 electrons for the high CG case and 9 electrons for the low CG case. In some embodiments, the combining of low CG and high CG within the image sensor is accomplished through the use of a dual-ADC (analog-to-digital converter).

FIG. 17A shows a pixel response curve for the high CG case. For this case, the horizontal axis 1702 may be considered to equivalently represent either the number of photons striking the well or the number of electrons stored in the well. The pixel output data represented by the vertical axis 1704 may be given in voltage. For the case in which light is faint so that relatively few photons reach the pixel well, pixels remain below the saturation limit 1708 while having the advantage of a relatively low readout noise (2 electrons in this example). For the case in which the light level is above the saturation limit 1708, the output response saturates, which is to say that the output voltage of the well levels off to a saturation output level 1710.

FIG. 17B shows a pixel response curve for the low CG case. For this case, the horizontal axis 1712 represents the number of photons striking the well or the number of electrons stored in the well. The pixel output data represented by the vertical axis 1714 may be given, for example, in voltage. For the case in which light is strong so that relatively many photons reach the pixel well, saturation is avoided. Even though the readout noise is relatively larger in this case compared to the high CG case, the signal-to-noise ratio is still relatively good.

FIG. 17C illustrates an embodiment for combining the results of the high CG and low CG data to obtain a high dynamic range (HDR). For this case, the horizontal axis 1702 represents input data and the vertical axis 1724 represents the output data. FIG. 17C illustrates a method for combining the high gain response curve 1706 with the low gain response curve 1716 to obtain a to obtain a composite response curve that includes an extended region 1726 that results in an HDR response. For input data having a level above the saturation limit 1708, the captured input data 1710 to the right of the saturation limit 1708 is increased by the ratio of high CG to low CG. This causes the input data obtained for the curve 1716 below the saturation limit 1708 to be increased in a movement 1730 by the amount 1740, which when converted to bits is referred to as the bit extension. Since the signal-to-noise ratio is approximately the same for the high CG and low CG, the dynamic range is improved approximately by the bit extension, resulting in HDR. As shown in FIG. 17C, the bit extension 1740 seamlessly extends the range of output values in the extended region 1726 to obtain the HDR.

Figure 18A:
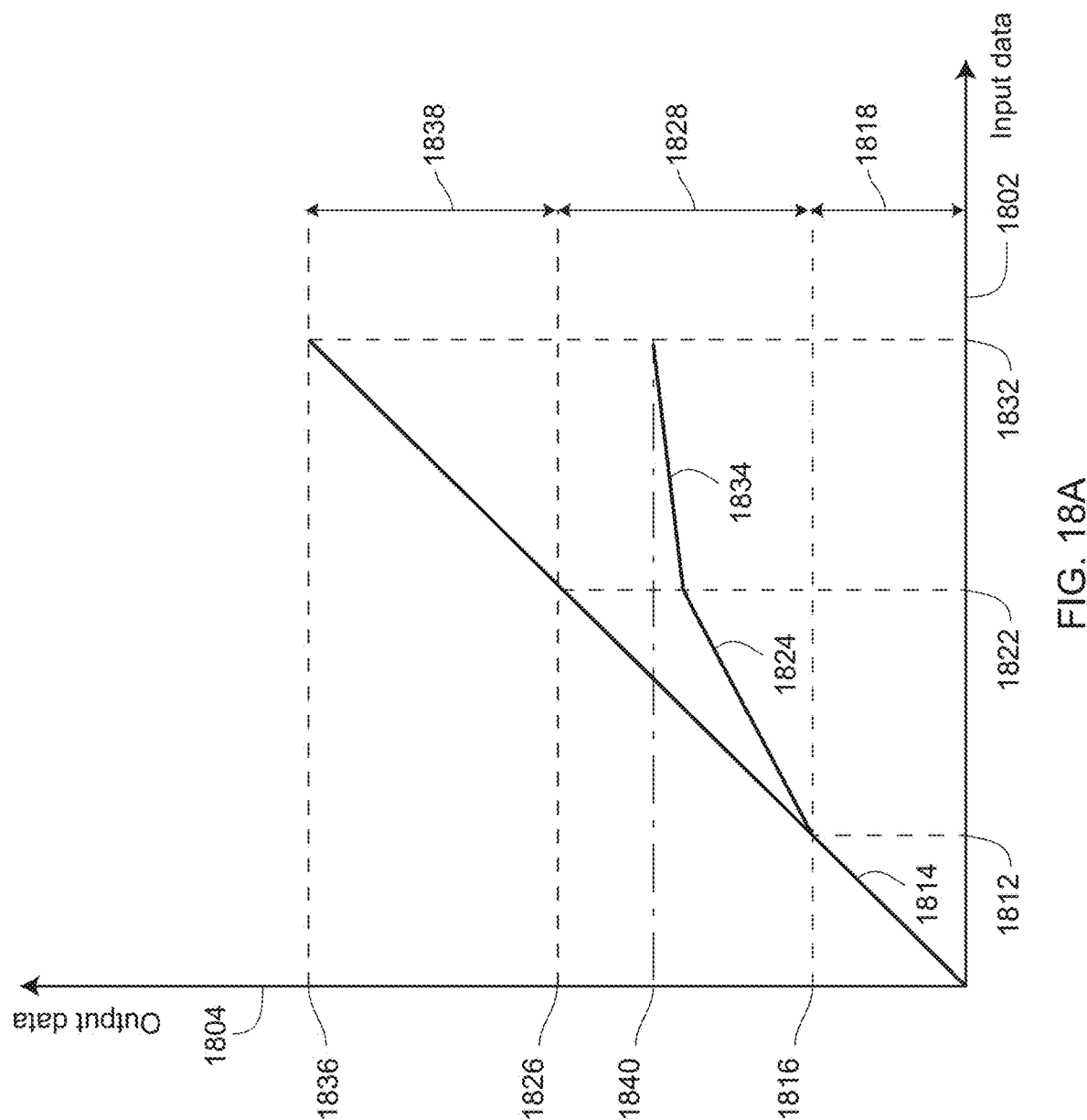
FIG. 18A illustrates use of multiple compression break points to obtain high dynamic range according to an embodiment of the present disclosure.

In another embodiment illustrated in FIG. 18A, image sensors such as the sensors 1410A, 1410B use a method of gradation compression to obtain HDR, enabling a scanning 3D measuring device such as 1000 or 1300 to measure both relatively very dim and very bright reflections. In an embodiment, the image sensors 1410A, 1410B are set to have a plurality of compression break points such as the points/levels 1812, 1822. As in the discussion of FIGS. 17A, 17B, 17C, the horizontal axis 1802 in FIG. 18 represents input data, which is to say the electrical signal (for example, in microvolts) generated in response to electrons in the pixel well. The pixel output data represented by the vertical axis 1804 may also be given in voltage. In an embodiment, for input data between 0 and the level 1812 and an output data between 0 and level 1816, gradation compression is not applied to the input data, resulting in the response curve 1814. For input data in the region between 1812 and 1822, the gain is reduced or compressed, resulting in a smaller slope in the response curve 1824. For input data in the region between 1822 and 1832 (having an output data corresponding to level 1826), the gain is further reduced or compressed, resulting in a still smaller slope in the response curve 1834. The maximum level of the resulting output data is given by the line/level 1840. For example, in a representative image sensor, the level 1840 might correspond to 12 bits (or 4095). Without compression, the signals may be considered small signals covering the range 1818, medium signals that further cover the range 1828, or large signals that further cover the range 1838. In effect, the maximum signal without compression 1836 is compressed to the level 1832. Hence, as illustrated in FIG. 18, the method of gradation compression increases dynamic range.

Figure 18B:
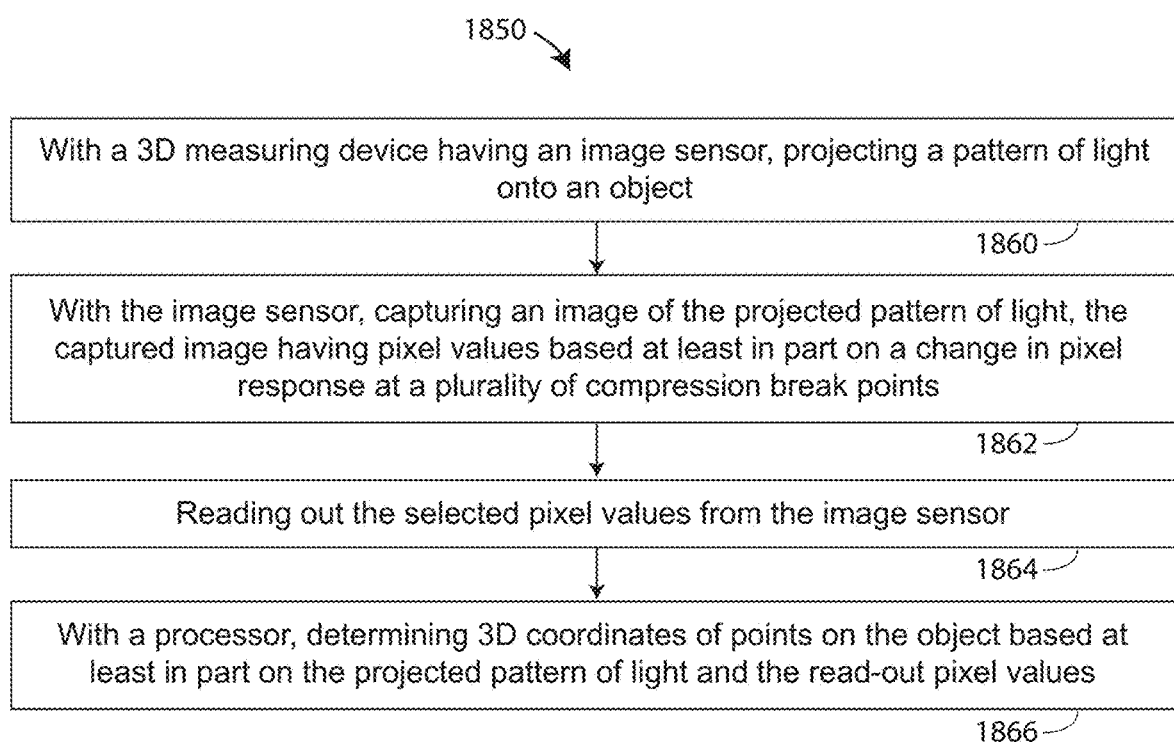
FIG. 18B is a description of a method for using multiple compression points to obtain high dynamic range.

FIG. 18B describes elements in a method 1850 for using gradation compression to increase dynamic range. An element 1860 includes, with a 3D measuring device having an image sensor, projecting a pattern of light onto an object. An element 1862 includes, with the image sensor capturing an image of the projected pattern of light, the captured image having pixel values based at least in part on a change in pixel response at a plurality of compression break points. An element 1864 includes reading out the selected pixel values from the image sensor. An element 1866 includes, with a processor, determining 3D coordinates of points on the object based at least in part on the projected pattern of light and the read-out of pixel values.

Figure 19:
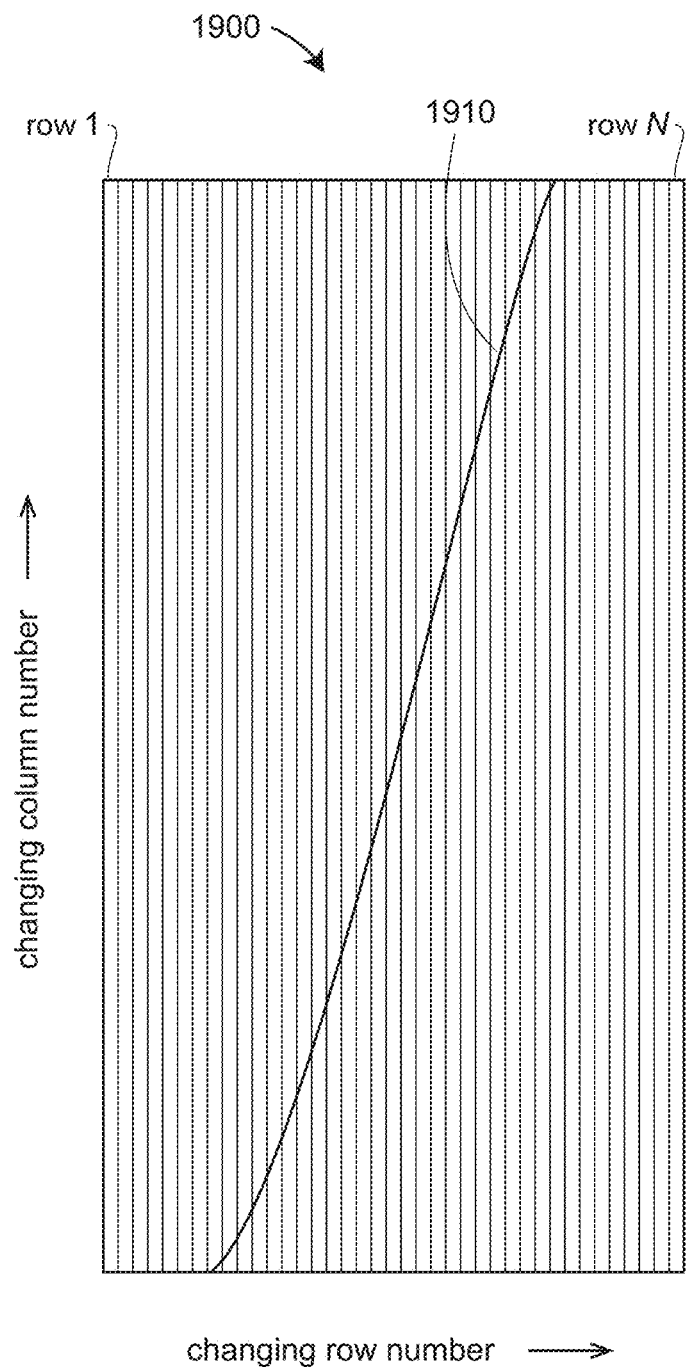
FIG. 19 is an image that illustrates how ability to select between vertical and horizontal readout provides many advantages to 3D measuring systems in some cases.

As illustrated in FIG. 4, in a typical case, an emitted laser line 400 is usually projected perpendicular to a line connecting the projector 210 to the camera 220. In other words, for a line scanner held as in FIG. 4, the line is vertical rather than horizontal. To collect a relatively large number of data points on the scanned object, it is customary to align the projected laser line 400 to the long side of the image sensor within the camera. Ordinarily, image sensors are shown in landscape view having the long side of the image sensor along the horizontal direction, which is the reverse of the actual direction of the image sensor as it would be aligned in FIG. 4. Hence, in FIG. 19, the row numbers change along the horizontal axis and the column numbers change along the vertical axis. In prior art line scanners such as the line scanner 200 in FIG. 4, processing of the data from the image sensor is carried out a row at a time starting with first row within the scan region and ending with the last row N in the region. However, this order of data collection is the reverse of the order obtained by the line scanner. In FIG. 19, a movement from left to right, corresponding to a changing row number, corresponds to a changing distance to the object under test. In other words, for the geometry shown in FIG. 19, calculations are carried out a column at a time rather than a row at a time. To make this possible, in the past, much more data was stored than is used in the calculation of the centroid of the imaged line of laser light 1910 along each projected line column. In an embodiment, the image sensor 1900 can be set to read in either vertical or horizontal mode, thereby greatly simplifying the calculation of the 3D coordinate of each point on the projected laser line. Advantages gained by selecting the better of the horizontal or vertical directions include: (1) reduced data storage requirements, (2) simpler algorithms for calculating 3D coordinates, and (3) better processor utilization.

Binning is a procedure in which multiple values are combined into a single "bin." For example, an image processor that supports 2×2 binning will report signal levels obtained from pixel groups that are 2 pixels wide and 2 pixels high. A potential disadvantage in the use of binning is a reduction in image resolution, but potential advantages include (1) higher speed, (2) reduced processing, (3) faster data transfer, (4) higher signal-to-noise ratio in some cases, and (5) reduced speckle.

In an embodiment, 2×2 binning is used. With this type of binning a square formed of two vertical pixels and 2 horizontal pixels are treated as a block, with the values of the four pixels summed together. For this case, speed and data transfer are both increased by a factor of four. Signal-to-noise ratio is expected to increase when signal levels are low. Such low signal levels might result, for example, from materials such as shiny or transparent materials having low reflectance. With 2×2 binning, the signal level received by the binned pixels is expected to increase by a factor of 4, which in most cases will cause the signal-to-noise ratio to increase significantly. Binning is also expected to decrease speckle relative to the signal level captured by the binned pixels. To further speed measurement and reduce processing, binning may be combined with windowing, which is to say selecting a region of interest (ROI) within a pixel array. The use of windowing with line scanners is discussed in the commonly owned U.S. patent application Faro '923, discussed herein above.

Figure 20B:
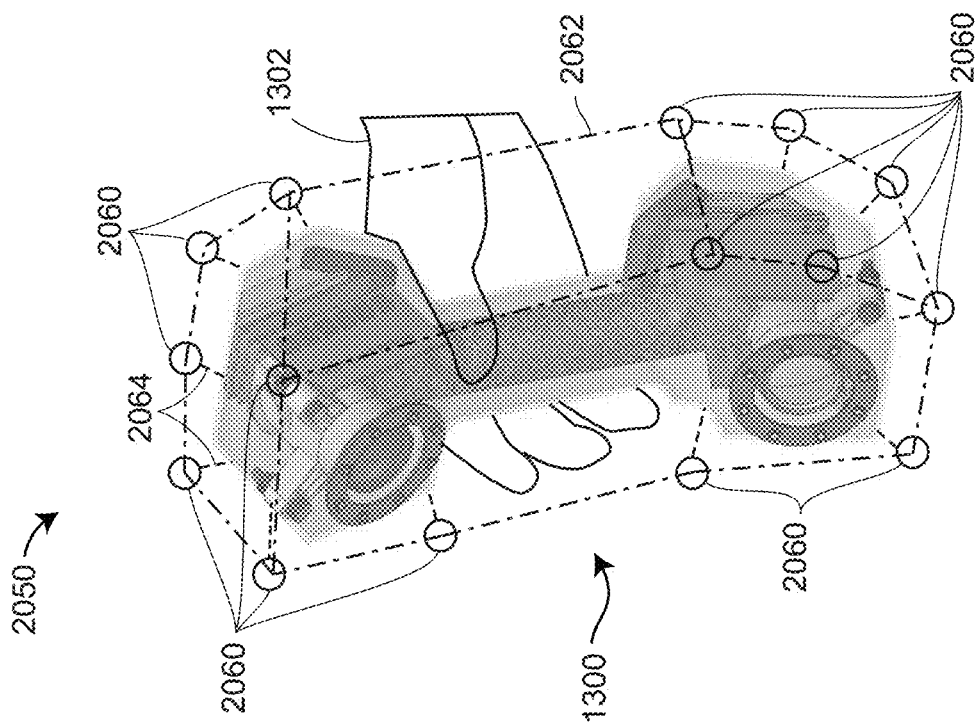
FIG. 20B is a schematic representation of a handheld 3D measuring device with a collection of reflectors or light sources for imaging by the stereo camera of FIG. 20A according to an embodiment of the present disclosure.

In an embodiment illustrated in FIG. 20B, a self-registering 3D measuring system 2050 includes a 3D measurement device such as handheld scanner 1000 or 1300 and a collection of visible targets 2060, which in embodiments adhesive reflectors and LEDs. In an embodiment, the collection of light targets 2060 are coupled to a frame 2062, which are removably attached to the handheld scanner such as 1000, 1300. In other embodiments, the visible targets 2060 are directly affixed to the handheld scanner 1000, 1300 with connector elements 2064. The self-registering 3D measuring system 2050 may be directly connected to an external computer 1220 such as a workstation computer or networked computer. Alternatively, the self-registering 3D measuring system 2050 may be affixed to a wearable unit 1200 that includes computing unit 1205 and battery 1210, connected as shown in FIG. 12.

Figure 20A:
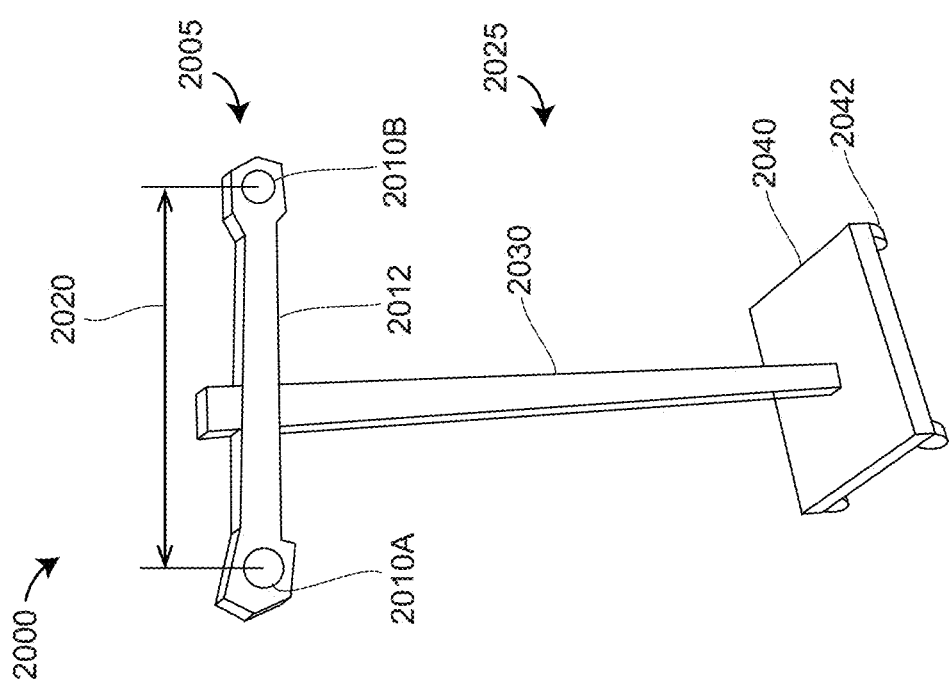
FIG. 20A is perspective view of a stereo camera and stand according to an embodiment of the present disclosure.

As shown in FIG. 20A, in an embodiment, a viewing system 2000 includes a stereo camera assembly 2005 and a stand assembly 2025. In an embodiment, the stereo camera assembly 2005 includes a first camera 2010A, a second camera 2010B, and a connecting element 2012, the first camera 2010A and the second camera 2010B being separated by a baseline distance 2020. The stand assembly 2025 includes a mounting structure 2030, a base 2040, and optional wheels 2042. In some embodiments, the stand assembly is a tripod. In other embodiments, the stand assembly is an instrument stand. In some embodiments, the first camera 2010A and the second camera 2010B are independently mounted, with the baseline distance between adjustable according to the selected mounting arrangement. In an embodiment, the stereo camera captures images of the visible targets 2060 as the 3D measuring system 2050 is moved from place to place. One or more processors, which may include some combination of the self-registering 3D measuring system 2050, the computing unit 1205, and the external computing system 1220, determines the 3D movement from frame to frame based on matching of the visible targets 2060 from frame to frame. With this method, the lines 1330A, 1330B from the projectors 1310A, 1310B or any other patterns projected by 3D measuring devices such as 1000, 1300 can be tracked as the 3D measuring system is moved from point to point. By coupling the visible targets 2060 to the 3D measuring device such as 1000, 1300, accurate measurement of 3D coordinates of an object is provided without requiring the placing or removing of reflective targets.

Figure 21C:
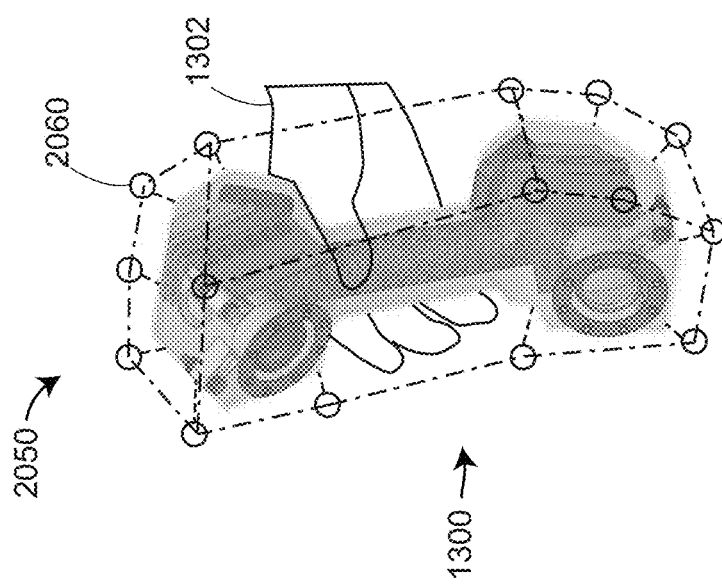
FIG. 21C is a schematic representation of a handheld measuring device with a collection of reflectors or light sources for imaging by the stereo camera of FIGS. 21A, 21B according to an embodiment of the present disclosure.
Figure 21B:
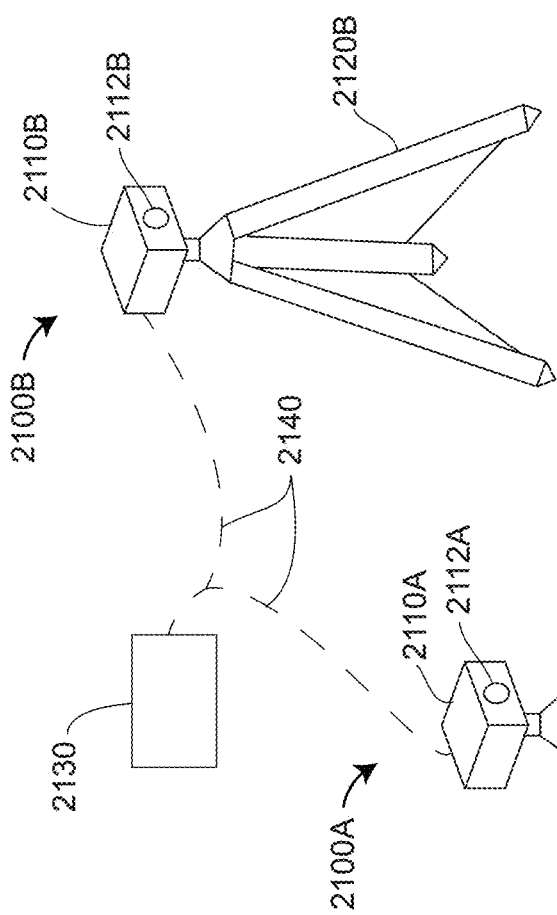
FIGS. 21A, 21B is a schematic representation of two cameras connected to a processor according to an embodiment.
Figure 21A:
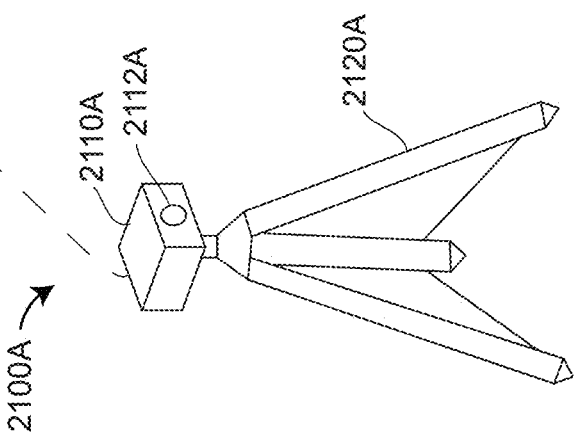

As shown in FIGS. 21A, 21B, 21C, camera systems 2100A, 2100B capture images visible targets 2060 of a 3D measuring system 2050 and to use those captured images to track the pose (position and orientation) of the handheld scanner 1300 as it is moved from position to position by an operator 1302. The camera systems 2100A, 2100B take the place of the cameras 2010A, 2010B in FIG. 20A. In an embodiment, electrical signals from the cameras 2100A, 2100B are sent over a wired or wireless communication channel 2140 to a computing system (processor) 2130 that calculates the 3D coordinates. To perform this calculation, the computing system 2130 uses the relative pose (position and orientation) of the two cameras 2110A, 2110B. In an embodiment, the relative pose of the two cameras 2110A, 2110B is determined by performing a compensation procedure in the field. An exemplary compensation procedure involves capturing a pattern on an artifact such as a dot plate. Such an artifact may be moved to a plurality of positions and orientations and the cameras 2110A, 2110B used to capture images in each case. Optimization methods such as bundle adjustment are then used to determine the relative pose of the cameras 2110A, 2110B. Cameras 2110A, 2110B include optical imaging systems 2112A, 2112B having lenses, image sensors, and processing electronics. In an embodiment, the lenses within optical imaging systems 2112A, 2112B are zoom lenses that enable magnification of the visible targets 2060 on the 3D measuring system 2050. The cameras 2110A, 2110B may be mounted on any sort of mounting stands 2120A, 2120B, for example, on tripods, instrument stands, or other structures within a factory.

In some cases, it is desirable to have a greater or larger optical magnification than provided by the lenses in the cameras in the handheld 3D measuring devices such as 1300 or 1000. A greater magnification covers a smaller region of the object in each captured image, but it provides greater details, which enables greater 3D measurement accuracy and resolution. In contrast, a lesser magnification covers a larger region of the object in each captured image, which enables measurements to be made faster but with less resolution. A method to enable magnification to be quickly changed while using the same basic 3D measurement assembly is illustrated in FIGS. 22A, 22B, 22C, 23A, and 23B.

Figure 22A:
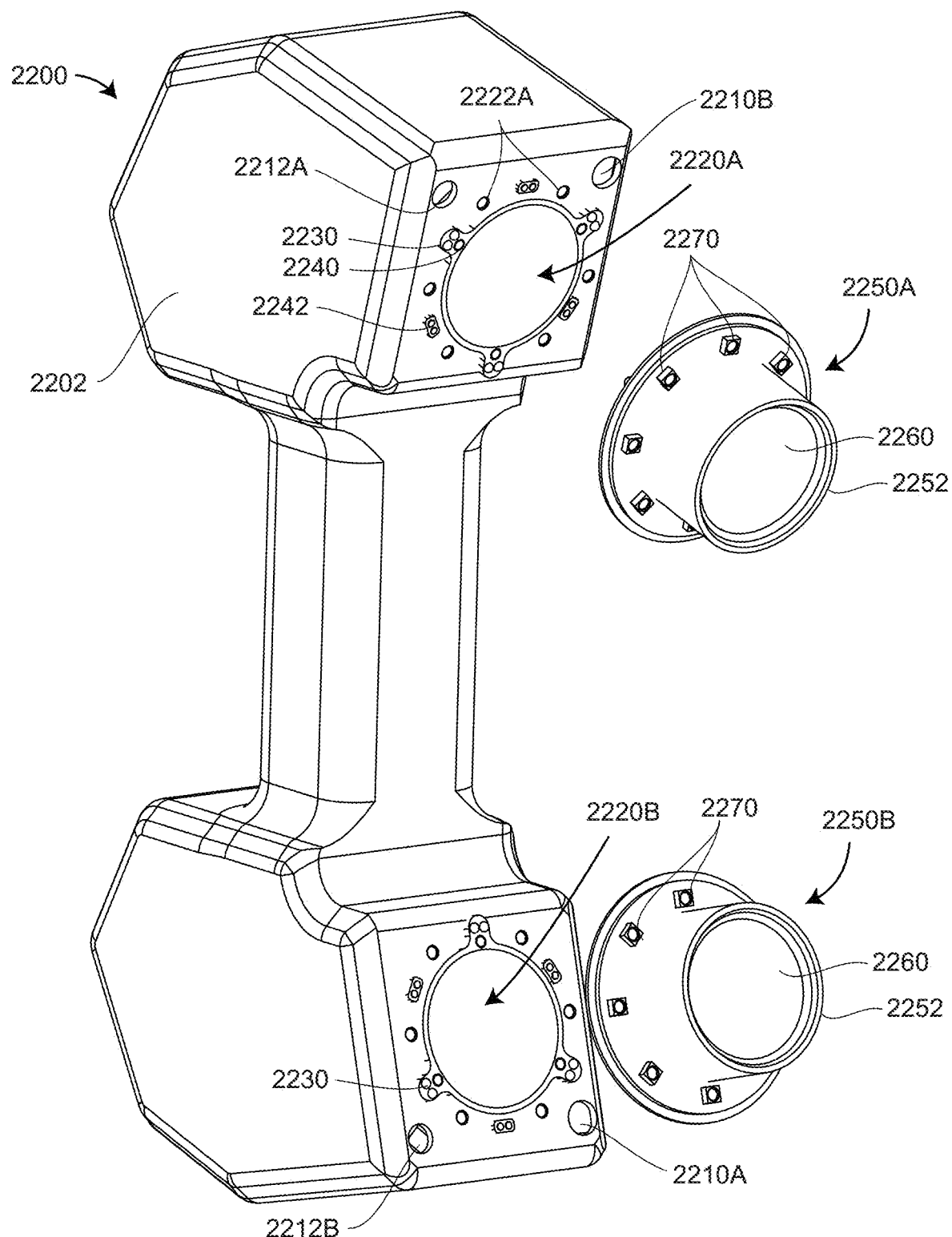
FIGS. 22A, FIG. 22B, FIG. 22C are exploded views of a camera 2200 with attachable adapter lenses according to an embodiment of the present disclosure.
Figure 22C:
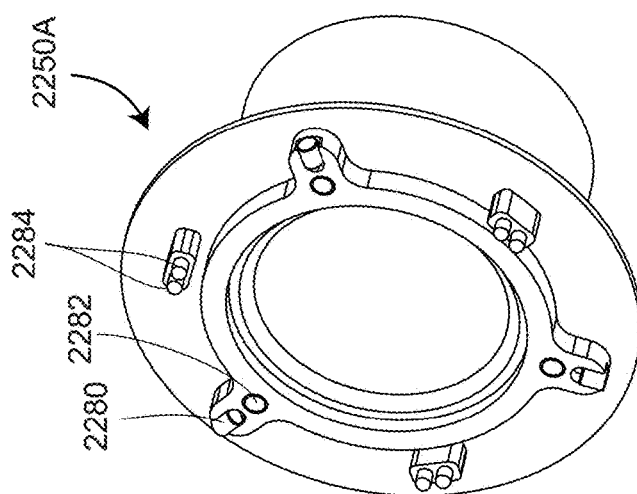
Figure 22B:
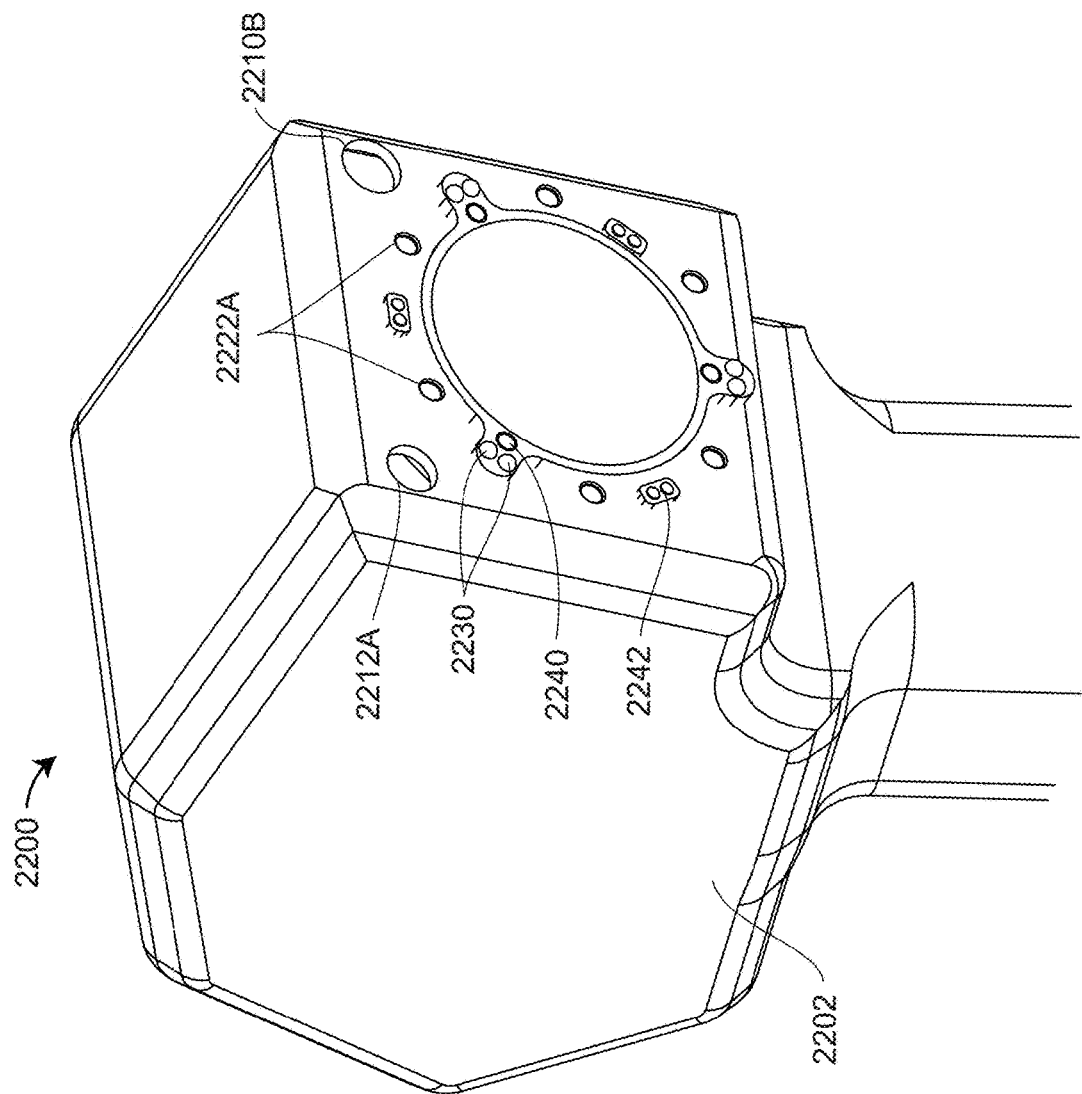

FIGS. 22A, 22B, 22C are exploded views of a camera 2200 with attachable adapter lenses 2250A, 2250B. The camera 2200 is a handheld 3D measuring device, which includes housing 2202, cameras 2220A, 2220B, light projectors 2210A, 2210B, 2212A, 2212B, recessed illuminator LEDs 2222A, 2222B, first kinematic elements 2230, first magnets 2240, and electrical pin receptacles 2242. Each adapter lens assembly 2250A, 2250B includes a housing 2252, adapter lens elements 2260, and illuminator LEDs 2270. Additional elements on the rear side of the adapter lens assembly 2250A are shown in FIG. 22C. These include second kinematic elements 2280, second magnets 2282, and electrical pin connectors 2284. In the exemplary embodiment of FIG. 22C, second kinematic elements 2280 are cylinders and first kinematic elements 2230 are a pair of spherical surfaces. Each of the three first kinematic elements 2230 contact the three second kinematic elements 2280. In general, kinematic connectors like to those shown in FIGS. 22B, 22C enable the adapter lens assembly 2250A or 2250B to be detached and then reattached with a high degree of repeatability in the resulting position and orientation. The first magnets 2240 are made to magnetically attach to corresponding second magnets 2282. The electrical pin connectors 2284 plug into electrical pin receptacles 2242, thereby providing electricity to power the illuminator LEDs 2270.

Figure 23A:
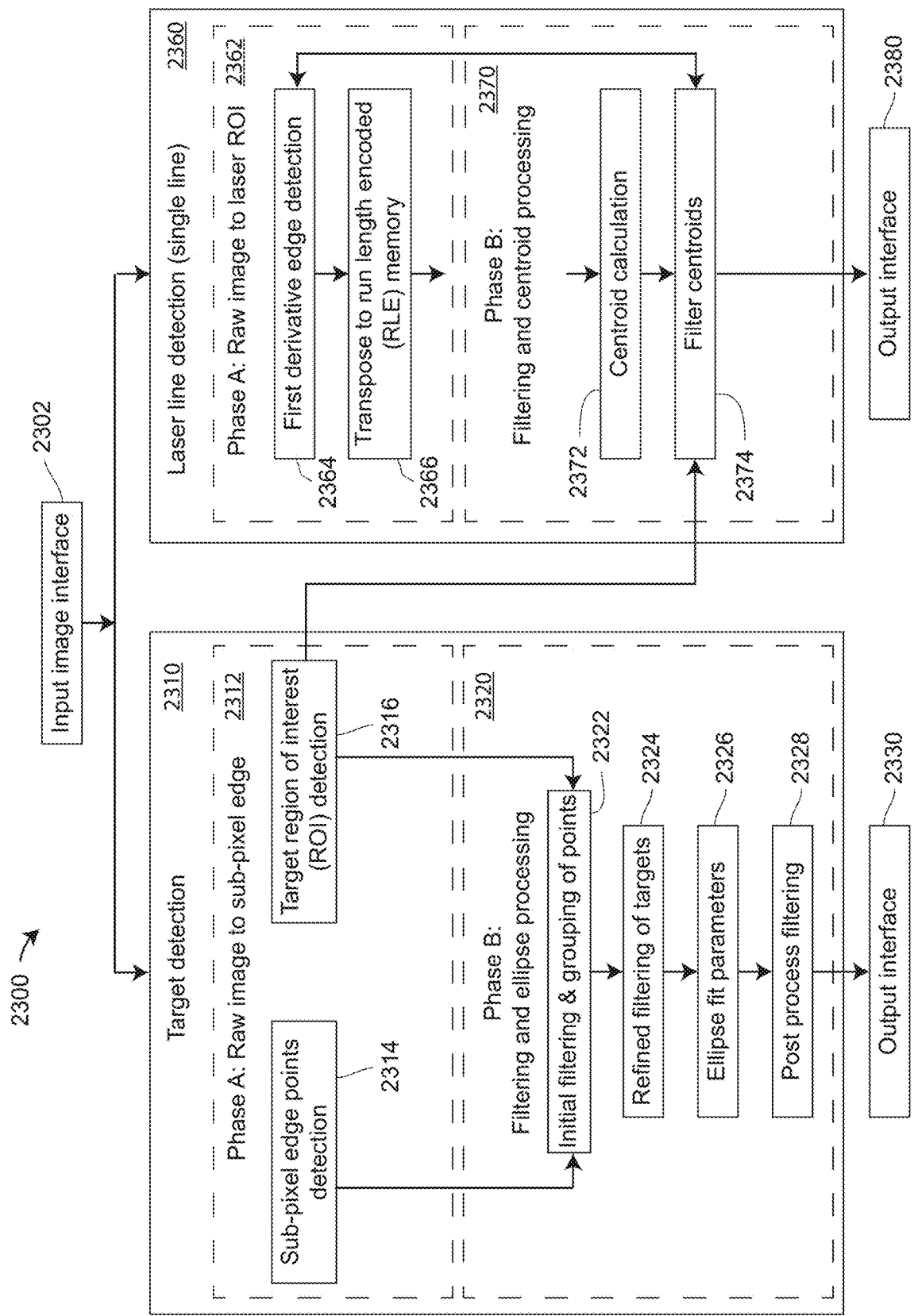
FIG. 23A is a block diagram showing processing tasks undertaken by electrical circuitry within the handheld scanner to determine the coordinates of imaged lines while also determining the centers of markers on objects according to an embodiment of the present disclosure.

FIG. 23A is a block diagram showing processing tasks undertaken by electrical circuitry within the handheld scanner to determine the location of projected lines on the image sensor while also determining the location of markers placed on objects. In an embodiment, the processing tasks of FIG. 23A are carried out in conjunction with the electronics of FIG. 14. In the embodiment of FIG. 14, a handheld scanner such as the scanner 2200 shown in FIG. 22A includes the electronics shown in FIG. 14. As explained herein above with reference to FIG. 12, in one approach, electrical signals are sent over a cable 1215 directly to a stand-alone computer or computer network 1222 or alternatively to a wearable computer 1205. In the approach of FIG. 12, signals may also be sent wirelessly to a mobile display 1240, computer, or another device.

An example of processing tasks carried out by electronics within the handheld scanner such as the scanner 2200 of FIGS. 22A, 22B, 22C or the handheld scanner 1000 of FIG. 12 is exemplified by the computational processing elements 2300 shown in the block diagram of FIG. 23A. The input image interface 2302 is the interface to electronics that provides data to target detection processing block 2310 and the laser line detection block 2360. Processing is performed simultaneously by the block 2310 and the block 2360.

The target detection processing block 2310 determines the image locations of the centers of targets placed on objects. In an embodiment, the targets are circular adhesive reflecting dots such as are commonly used in photogrammetry measurements. In the sub-block 2312, phase A calculations convert a raw image to edges having sub-pixel resolution. Within the sub-block 2312, an element 2314 finds sub-pixel edge points of targets, and an element 2316 identifies a target region of interest (ROI).

In the sub-block 2320, phase B calculations are performed, providing filtering and ellipse processing. Phase B includes initial filtering and grouping of points 2322, refined filtering of targets 2324, finding ellipse fit parameters 2326, and post-process filtering 2328. The output of the processing steps 2320 of phase B go to the output interface 2330, which may lead to further electrical and processing circuitry within the system.

At the same time as the target detection processing block 2310 is filtering image data and processing ellipse characteristics of the imaged targets, a laser line detection block 2360 determines the positions the projected laser lines on the image sensor. In the sub-block 2362, phase A calculations are performed that include finding edges of projected lines, for example, by using first derivative edge detection as in element 2364. In an embodiment, the block 2362 further includes lossless data compression of the results of the edge detection, for example, by performing run length encoding (RLE) in an element 2366.

In the sub-block 2370, phase B calculations are performed, providing filtering and centroid processing. As explained herein above, centroid processing is used to determine image coordinates of centroids along a projected laser line as imaged by one of the cameras in the line scanner. An example of such a projected laser line as detected by an image sensor is the line 1910 shown in FIG. 19. In the block 2370, centroid calculation is performed in an element 2372, and centroid filtering is performed in an element 2374. Centroid filtering 2374 may remove unwanted multipath reflections, for example, and unwanted noise. The output of the processing steps 2370 go to the output interface 2380, which may lead to further electrical and processing circuitry within the system.

As explained herein above in reference to FIG. 14, FPGAs 1415A, 1415B provide processing for the laser lines projected onto objects to determine the locations of the lines on one or more image sensors. The FPGAs 1415A, 1415B further provide processing for determining locations of targets on the one or more image sensors. The use of the FPGAs 1415A, 1415B in combination with other electronics such as the DDR4 memories 1418A, 1418B provides many advantages compared to processing on a stand-alone or networked computer. First, the FPGAs 1415A, 1415B perform on-board processing, thereby greatly reducing the data sent to the stand-alone or networked computer. Second, the onboard processing of the FPGAs 1415A, 1415B reduces the size of data transfers since computations are performed on the fly. This improves computational efficiency and speed. The use of the FPGAs 1415A, 1415B allows the characteristics of the targets and the imaged lines of light to be determined. This is done using customized processing blocks such as those shown in FIG. 23A. These blocks optimize centroid and target extraction calculations. The ability to simultaneously process projected laser lines and imaged targets on each of the two cameras such as the cameras 1320A, 1320B or the cameras 2220A, 2220B provides precise synchronization along with high speed. Furthermore, this approach enables targets placed on objects to be illuminated and measured at the same time laser lines are projected on objects and measured, thereby eliminating registration errors resulting from lack of synchronization.

Although the description herein described the processors, such as the FPGAs 1415A, 1415B in the handheld unit, as extracting information to locate lines and markers on the image displays, in other embodiments processors in the handheld unit have sufficient speed and power to extract 3D coordinates directly from the captured images.

Figure 23B:
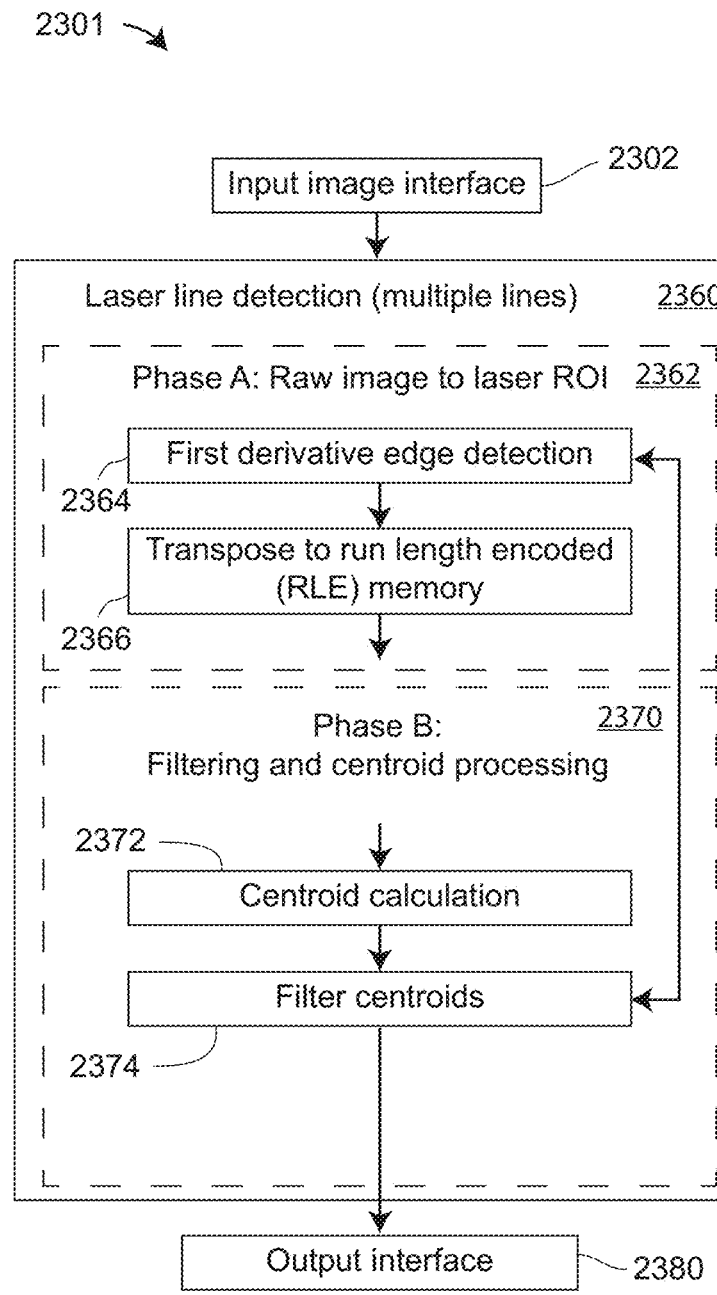
FIG. 23B is a block diagram showing processing tasks undertaken by electrical circuitry within the handheld scanner to determine the coordinates of multiple imaged lines according to an embodiment of the present disclosure.

A second example of processing tasks carried out by electronics within the handheld scanner such as the scanner 2200 of FIGS. 22A, 22B, 22C or the handheld scanner 1000 of FIG. 12 is exemplified by the computational processing elements 2301 shown in the block diagram of FIG. 23B. The input image interface 2302 is the interface to electronics that provides data to target detection processing block 2310 and the laser line detection block 2360. Processing is performed simultaneously by the block 2360 without requiring use of processing elements in the block 2310. The processing carried out in FIG. 23B is appropriate for operation in the geometry tracking mode discussed herein above in reference to FIGS. 13A, 13C, 13D. The geometry tracking mode is used when markers have not been placed on objects. By processing the multiple projected lines of light illustrated in FIGS. 13C, 13D, images collected at different positions of the handheld scanner can be registered together, even without placing reflective markers on objects under test. The elements of the block 2360 of FIG. 23B are the same as the elements of the block 2360 of FIG. 23A. However, in most cases, the processing steps of the elements of block 2360 in FIG. 23B will be performed on multiple lines of light in any one captured image, while in most cases the elements of the block 2360 of FIG. 23A will be performed on a single line in any one image.

Figure 24:
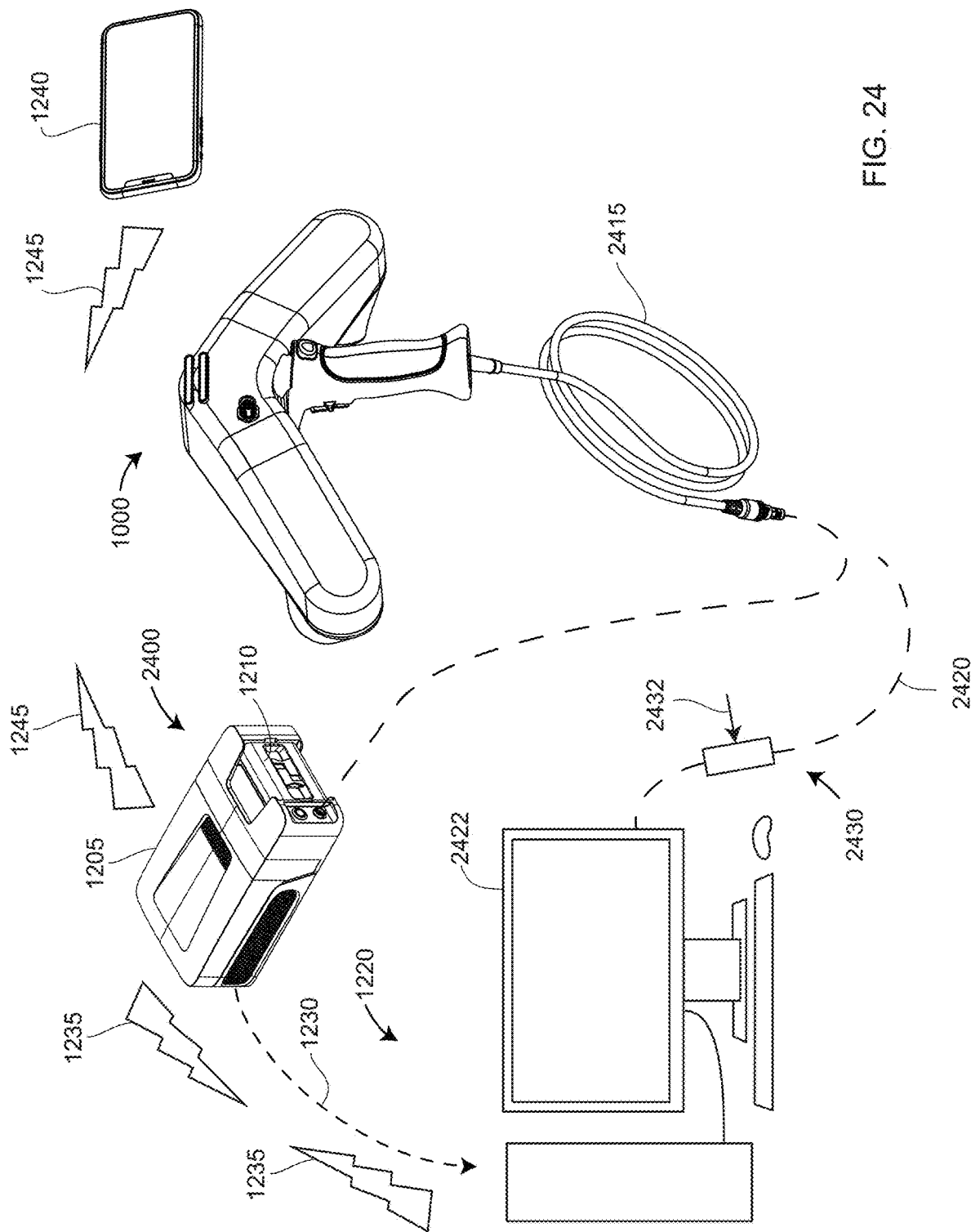
FIG. 24 is a schematic representation of a handheld LLP showing possible connections to optional accessory elements including a wearable computer, a desktop computer, and mobile display according to an embodiment of the present disclosure.

In FIG. 12, the cable that goes from the line scanner 1000 to the wearable unit 1200 or the external computer 1220 was shown to receive a signal over a cable 1215, which it was said might be a USB or Ethernet cable. In an alternative embodiment shown in FIG. 24, the cable 1215 is replaced by an Ethernet cable 2415 operable to 10 Gb/s or more and to transmit data in cables up to 100 meters long while at the same time providing Power over Ethernet (PoE) to the handheld scanner such as the scanner 1000 from the wearable unit 1200 or computer 2422. FIG. 24 shows that an element 2430 has been attached to the Ethernet cable 2420 that runs to the computer 2422. In an embodiment, the element 2430 is a single port PoE midspan, a device that injects DC power 2432 from a power mains onto the Ethernet cable, coupling the DC power for delivery to the line scanner 1000. In an embodiment, the PoE midspan unit provides up to 60 Watts of electrical power over PoE to the line scanner 1000. Ethernet variants 1000BASE-T (gigabit Ethernet), 2.5GBASE-T, 5GBASE-T, and 10GBASE-T, each uses all four pairs of twisted cables for data transmission. In sending electrical power by PoE, a phantom power technique is used in which a common-mode voltage is applied to each pair of wires. Because twisted-pair Ethernet uses differential signaling, this does not interfere with data transmission.

In FIG. 15, which shows electronics within the wearable PC 1500, the cable 1505 is a USB cable that bidirectionally sends data between the wearable unit 1500 and the handheld unit 1000. The USB cable also provides electrical power from the wearable unit 1500 to the handheld unit 1000. Inside the wearable PC 1500, data and power pass through the industrial USB connector 1515A and data passes to and from the USB SuperSpeed+ unit over a line 1525. The USB SuperSpeed+ unit can receive and transmit data at up to 10 Gb/s. However, at this high data rate, data is transmitted over standard cables up to 3 meters long, which is much less than the 100 meters cable length possible with Ethernet to 10 Gb/s. It is possible to use active USB cables containing re-driver circuitry to help extend the range to 10 meters but this adds cost and complexity to the cable by integrating a small circuit board into the cable. Optical USB cables extend the range farther. However, this requires construction of a custom cable that uses a circuit board to do electrical to optical conversion and it also requires optical fibers running next to the copper power wires. The higher speed data and more complex cabling options can be problematic in industrial environments because of higher ambient electrical noise and the frailty of optical fiber.

Figure 25:
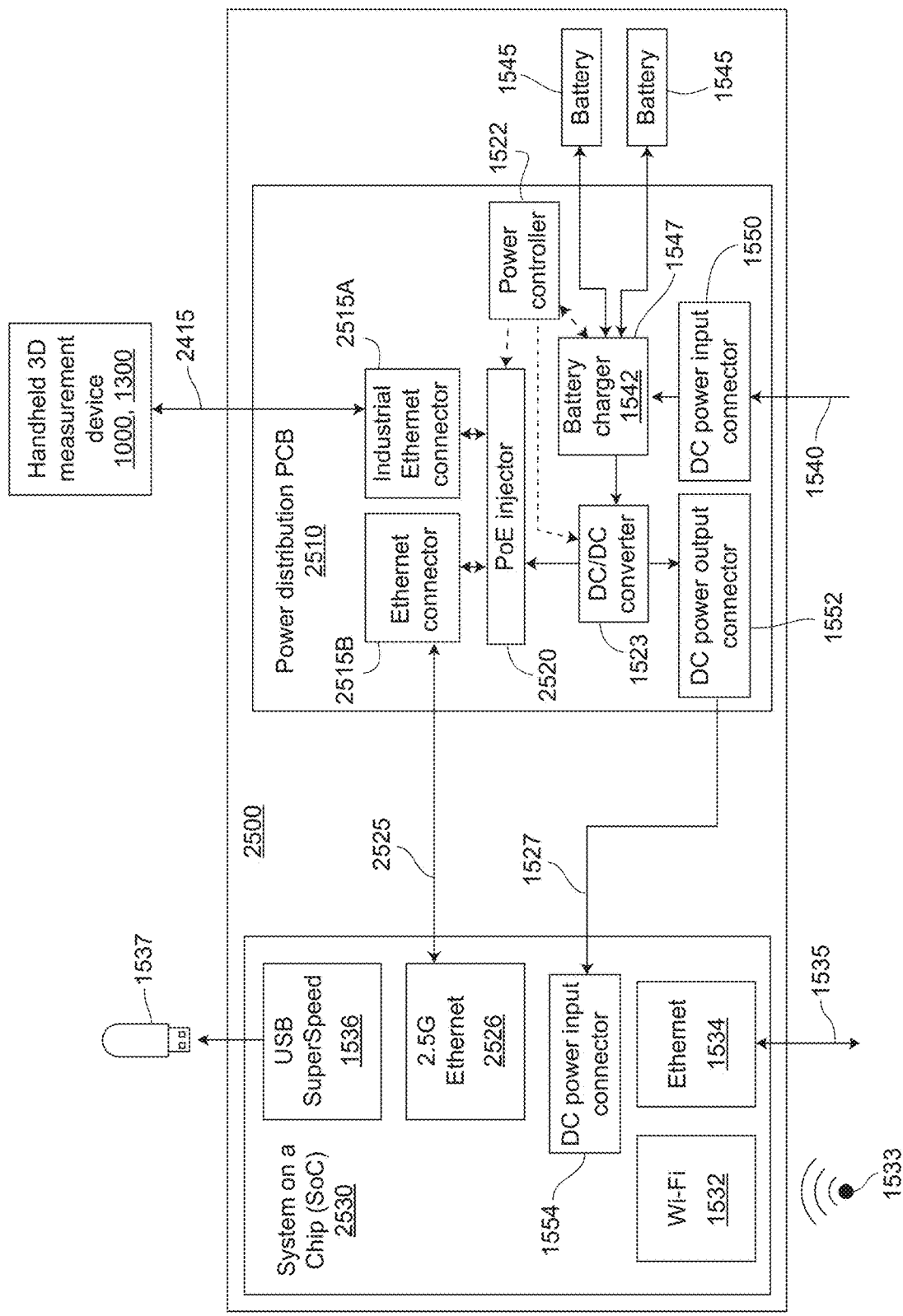
FIG. 25 is a block diagram showing electrical components within a wearable computer and other system components according to an embodiment of the present disclosure.

For these reasons, an alternative embodiment illustrated in a combination of elements shown in FIG. 24 and FIG. 25 has advantages over the combination of elements shown in FIG. 12 and FIG. 15. FIG. 25 shows that the cable 2415 that bidirectionally transmits data between the handheld measurement device such as the device 1000 or 1300 and the electronics 2500 within the wearable unit 2400. The electronics 2500 includes a Power distribution printed circuit board (PCB) 2510 and a system on a chip (SoC) 2530, which in an embodiment is an Intel Next Unit of Computing (NUC) device. In an embodiment, the SoC 2530 is interfaced to 2.5G Ethernet 2526, Wi-Fi 1532, Ethernet 1534, and a USB SuperSpeed flash drive 1537. Data arrives at an industrial Ethernet connector 2515A within the power distribution PCB 2510. The data is transferred bidirectionally to the PoE injector 2520 and power is transferred unidirectionally to the handheld measurement device such as 1000 or 1300. In an embodiment, the PoE injector 2520 is capable of transferring data at up to 10 Gbps. Electrical power is delivered to the PoE injector 2520 from a battery charger 1542 (via DC/DC converter 1523 for example) that may receive electrical power from either a 19-volt DC line 1540 or from either of two batteries 1545. In an embodiment, the batteries 1545 are removable and rechargeable. The battery charger 1542 sends some DC power to the PoE injector 2520, which distributes DC power upstream to the handheld unit (such as 1000 or 1300) according to the instructions of the power controller 1522. In an embodiment, the power controller 1522 is a microprocessor that controls the state of the PoE injector 2520, the battery charger 1542, and the DC/DC converter 1523. The battery charger 1542 also sends some DC power downstream through the DC power output connector 1552 through the cable 1527 to the DC power input connector 1554, which distributes power as required in the components of the System on a Chip (SoC) 2530. Data is transferred bidirectionally to and from the PoE injector 2520 to a second USB connector 2515B and through an Ethernet cable 2525 to a 2.5G Ethernet port 2526 affixed to the SoC 2530. In an embodiment, Wi-Fi 1532 sends wireless signals 1533 to the mobile phone display 1240. The battery charger 1542 delivers DC power from the batteries to the battery charger when required, and also charges the batteries 1545 when power is being supplied by the DC power line 1540.

Speckle is a granular interference that degrades the quality of imaged lines of laser light projected onto objects. Most surfaces are rough on the scale of an optical wavelength, resulting in the interference phenomenon known as speckle. A region of a surface illuminated by a laser beam may be seen as composed of an array of scatterers. For a laser, the scattered signals add coherently, which is to say that they add constructively and destructively according to the relative phases of each scattered waveform. The patterns of constructive and destructive interference appear as bright and dark dots in an image captured by cameras within the line scanner.

Speckle is usually quantified by the speckle contrast, with low speckle contrast corresponding to many independent speckle patterns that tend to average out in an image obtained by an image sensor within the line scanner. Methods for reducing speckle contrast in line scanners include (1) modulation of lasers used to generate laser lines, (2) using a vertical-cavity surface-emitting laser (VCSEL) array designed to reduce speckle contrast, and (3) using a superluminescent laser diode (SLD or SLED) that emits light over a larger linewidth than a laser, thereby reducing the coherent interference effects. In addition, a technique that may be used is to mix portions of emitted light, for example, by sending light through a multi-lens array or passing light from a multi-wavelength source such as a multimode optical fiber.

Electrical modulation as a way of reducing speckle has been demonstrated, for example, in 2012 by a research team at Schaefter+Kirchhoff GmbH in Hamburg, Germany (Laser Technik Journal, November 2012). A paper describing their research is available on-line at https://onlinelibrary.wiley.com/doi/pdf/10.1002/latj.201290005. In an embodiment shown in FIG. 26A, a laser 2614, such as a semiconductor laser within a line scanner, is electrically modulated. The line scanner might for example be the LLP 200 that produces a line of light 400 as explained herein above in reference to FIG. 4. Such a laser line probe might be designed for use with an AACMM. Alternatively, the line scanner might be designed for handheld use. Examples of such a handheld scanner are the line scanner 1300 in FIG. 13A and FIG. 13E or the line scanner 2200 shown in FIGS. 22A, 22B, 22C. In another embodiment, the line scanner may be used in either a handheld mode or attached to an AACMM, as illustrated by the line scanner 800 shown in FIG. 9 and FIG. 10.

Figure 26A:
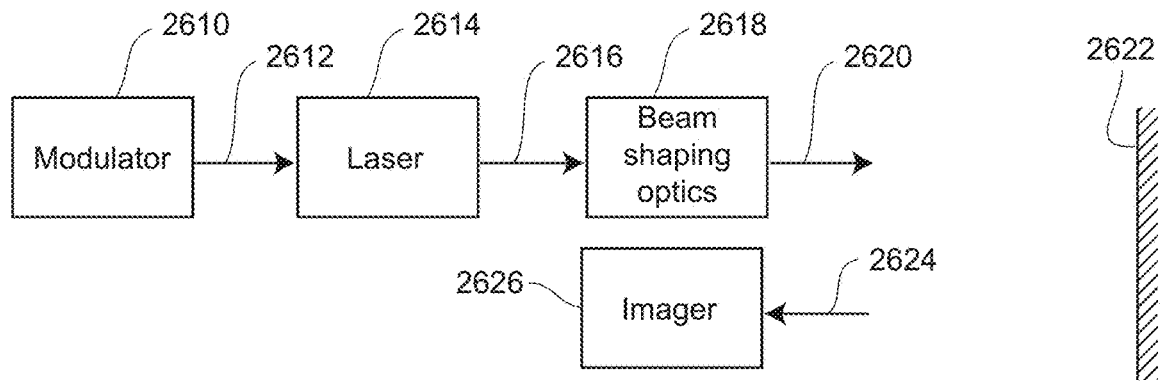
FIGS. 26A, 26B, 26C are block diagrams showing line scanner beam generating and detecting elements that reduce speckle noise according to an embodiment of the present disclosure.

In an embodiment, the laser 2614 within the line scanner is a mode hopping laser that emits a plurality of longitudinal modes. With this type of laser, modulation frequency may be relatively low, for example, around 1 MHz. In another embodiment, the laser within the line scanner supports a single longitudinal mode modulated at a higher frequency, for example, at around 1 GHz. In FIG. 26A, an electrical modulator 2610 sends an electrical signal 2612 such as a sine wave signal or a square wave signal to the laser 2614 within the line scanner. In response, the laser emits a modulated beam of light 2616. The modulated light 2616 passes through beam-shaping optics 2618 that forms the resulting beam of light 2620 into a line or similar shape, as described herein above. Such beam shaping optics may include a Powell lens or a cylindrical lens, for example. The resulting beam of modulated light 2620 scatters off a surface 2622, returning to the line scanner as scattered light 2624. The scattered light 2624 passes into an image sensor 2626. The detected light has lower speckle contrast than would otherwise be the case without the application of the electrical modulation to the laser 2614. The noise in the electrical signal produced by the image sensor 2648 is correspondingly reduced, thereby resulting in improved accuracy in determining 3D coordinates of points on objects.

In a related embodiment, the laser 2614 emits a plurality of different transverse modes that when combined produce a stable beam profile, although the beam profile is wider than would be the case in a Gaussian beam emitted from a laser that produces a single transverse mode. In this case, also, speckle contrast is expected to be reduced.

Figure 26B:
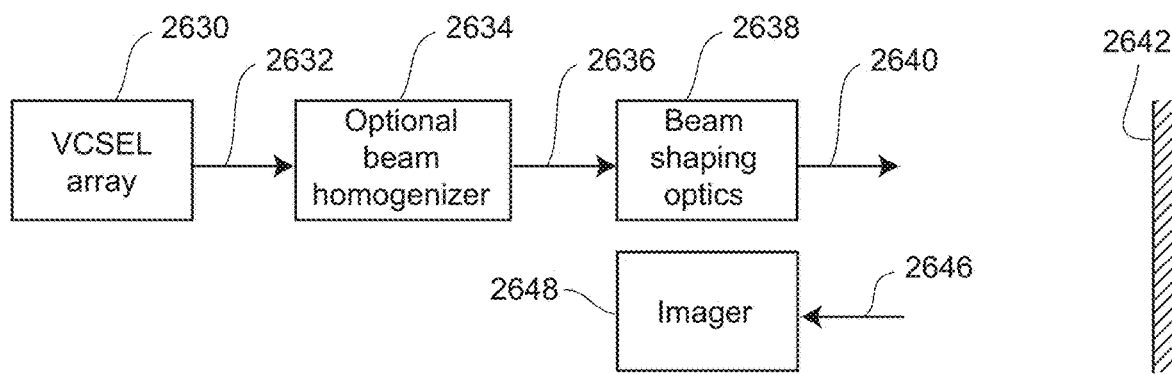

In another embodiment illustrated in FIG. 26B, a VCSEL array within the line scanner is designed to reduce speckle in light received by the line scanner. An example of such a VCSEL array is manufactured is the FLIR VCSEL laser array. The corporate headquarters for FLIR Systems is in Arlington, Virginia. This VCSEL array is available today at near infrared wavelengths of 840 nm and 860 nm. It is anticipated that such VCSEL arrays will be available in the future at red wavelengths between 600 nm and 700 nm, which would be practical to use in a line scanner requiring a visible wavelength. A brochure from FLIR showing examples of speckle reduction using a VCSEL array is available at this web page: https://www.flir.com/products/flir-vcsel-laser-diodes/?vertical=surveillance+general&segment=surveillance. An embodiment of a system based on a VCSEL array to reduce speckle is shown in FIG. 26B. A VCSEL array 2630 is placed within a line scanner such as the line scanner 200, 800, 1300, or 2200, as explained herein above. Light 2632 from the VCSEL array 2630 in the line scanner is optionally sent through a beam homogenizer 2634. The beam homogenizer might be a multi-lens array, for example. Output light 2636 is sent through beam shaping optics 2638 that produces a line or light or similar shape as the output beam 2640. Beam shaping optics 2638 might include a Powell lens or cylindrical lens, for example. The beam of light 2640 scatters off surface 2642 before passing into image sensor 2648. Use of the VCSEL array in the system of FIG. 26B results in a reduction in speckle contrast of the received light and a corresponding reduction in the electrical noise in the detected electrical signal.

Figure 26C:
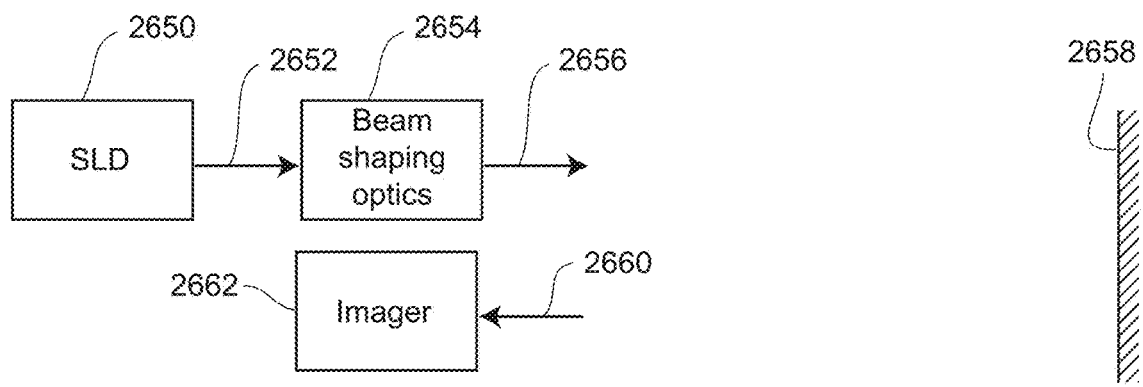

In another embodiment illustrated in FIG. 26C, the light source for a line scanner includes a superluminescent diode (SLED or SLD) that emits light over a larger linewidth than a laser, thereby reducing the coherent interference effects of speckle. Superluminescent diodes are available that emit at visible wavelengths from red to blue as well as at near infrared wavelengths. In an embodiment illustrated in FIG. 26C, light 2652 is generated by a SLED 2650 within a line scanner 200, 800, 1300, or 2200, for example. The generated light 2652 is sent through beam shaping optics 2654 to form a line of light or similar shape. The beam shaping optics 2654 may include, for example, a Powell lens or a cylindrical lens. The shaped beam of light 2656 is projected onto an object surface 2658. Scattered light 2660 is picked up by the image sensor 2662. Because of the increased linewidth of the light 2652 generated by the SLD, the speckle contrast of the light picked up by the image sensor 2662 is reduced, as is the corresponding electrical noise from the photosensitive array.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description but is only limited by the scope of the appended claims.

The invention claimed is:

1. A system comprising:
   a first light source operable to emit a beam of light;
   an electrical modulator operable to impart a time-varying modulation on the beam of light;
   a beam-shaping system operable to shape the beam of light into a line of light and to project the line of light onto an object;
   an image sensor operable to capture the line of light reflected from the object;
   at least one processor operable to determine three-dimensional (3D) coordinates of points on the object based at least in part on the reflected line of light captured by the image sensor; and
   an accessory device having a processor for receiving image data from the system over an Ethernet cable and in response determining additional 3D coordinates of points on the object based on the image data, the accessory device further sending electrical power over the Ethernet cable to the system.

2. The system of claim 1 wherein the modulation is one of sine-wave modulation and square-wave modulation.

3. The system of claim 1 wherein the light source is a laser.

4. The system of claim 3 wherein the laser is a mode-hopping laser.

5. The system of claim 1 wherein the beam-shaping system includes at least one of a Powell lens and a cylindrical lens operable to shape the beam into the line of light.

6. The system of claim 5 wherein the beam-shaping system further includes a multi-lens array.

7. The system of claim 1 wherein the light source is a laser operable to produce multiple longitudinal modes.

8. The system of claim 1 wherein the light source is a laser operable to produce multiple transverse modes.

9. The system of claim 1, wherein the beam-shaping system further comprises:
   a target-mode projector operable to project the line of light onto the object;
   an illuminator operable to illuminate at least one marker substantially near the object; and
   a geometry-mode projector operable to project a plurality of lines onto the object;
the image sensor further comprising:
   a first camera that captures a first target-mode image of the line of light on the object and light reflected from the at least one marker;
   the first camera further receiving a first geometry-mode image of the plurality of lines;
   a second camera operable to receive a second geometry-mode image of the projected plurality of lines, the geometry-mode projector being a different distance from the second camera than from the first camera; and
   the at least one processor determines first three-dimensional (3D) coordinates of points on the object based at least in part on the captured first target-mode image, and the at least one processor further determines second 3D coordinates of points on the object based at least in part on the first geometry-mode image and the second geometry-mode image, wherein at least the target mode projector and the first camera operate in a user-selectable target tracking mode and at least the geometry-mode projector, the first camera, and the second camera operate in a user-selectable geometry tracking mode.

10. The system of claim 1, wherein the light source is provided to reduce coherent interference effects of speckle.

11. A system comprising:
    a light source operable to emit a first beam of light;
    a vertical-cavity surface-emitting laser (VCSEL) array operable to emit a second beam of light;
    a beam-shaping system operable to shape at least one of the first beam of light and the second beam of light into a line of light and to project the line of light onto an object;
    an image sensor operable to capture the line of light reflected from the object;
    at least one processor operable to determine three-dimensional (3D) coordinates of points on the object based at least in part on the reflected line of light captured by the image sensor; and
    an accessory device having a processor for receiving image data from the system over an Ethernet cable and in response determining additional 3D coordinates of points on the object based on the image data, the accessory device further sending electrical power over the Ethernet cable to the system.

12. The system of claim 11 wherein the beam-shaping system includes at least one of a Powell lens and a cylindrical lens operable to shape the beam into the line of light.

13. The system of claim 11 wherein the beam-shaping system further includes a multi-lens array that homogenizes the beam of light.

14. The system of claim 13 wherein the beam-shaping system includes at least one of a Powell lens and a cylindrical lens operable to shape the beam into a line.

15. The system of claim 11, wherein the beam-shaping system further comprises: a target-mode projector operable to project the line of light onto the object;
   an illuminator operable to illuminate at least one marker substantially near the object; and
   a geometry-mode projector operable to project a plurality of lines onto the object;
the image sensor further comprising:
   a first camera that captures a first target-mode image of the line of light on the object and light reflected from the at least one marker;
   the first camera further receiving a first geometry-mode image of the plurality of lines;
   a second camera operable to receive a second geometry-mode image of the projected plurality of lines, the geometry-mode projector being a different distance from the second camera than from the first camera; and
   the at least one processor determines first three-dimensional (3D) coordinates of points on the object based at least in part on the captured first target-mode image, and the at least one processor further determines second 3D coordinates of points on the object based at least in part on the first geometry-mode image and the second geometry-mode image, wherein at least the target mode projector and the first camera operate in a user-selectable target tracking mode and at least the geometry-mode projector, the first camera, and the second camera operate in a user-selectable geometry tracking mode.

16. A system comprising:
   a superluminescent light source operable to emit a beam of light;
   a beam-shaping system operable to shape the beam of light into a line of light and to project the line of light onto an object;
   an image sensor operable to capture the line of light reflected from the object;
   at least one processor operable to determine three-dimensional (3D) coordinates of points on the object based at least in part on the reflected line of light captured by the image sensor; and
   an accessory device having a processor for receiving image data from the system over an Ethernet cable and in response determining additional 3D coordinates of points on the object based on the image data, the accessory device further sending electrical power over the Ethernet cable to the system.

17. The system of claim 16, wherein the beam-shaping system further comprises:
   a target-mode projector operable to project the line of light onto the object;
   an illuminator operable to illuminate at least one marker substantially near the object; and
   a geometry-mode projector operable to project a plurality of lines onto the object;
the image sensor further comprising:
   a first camera that captures a first target-mode image of the line of light on the object and light reflected from the at least one marker;
   the first camera further receiving a first geometry-mode image of the plurality of lines;
   a second camera operable to receive a second geometry-mode image of the projected plurality of lines, the geometry-mode projector being a different distance from the second camera than from the first camera; and
   the at least one processor determines first three-dimensional (3D) coordinates of points on the object based at least in part on the captured first target-mode image, and the at least one processor further determines second 3D coordinates of points on the object based at least in part on the first geometry-mode image and the second geometry-mode image, wherein at least the target mode projector and the first camera operate in a user-selectable target tracking mode and at least the geometry-mode projector, the first camera, and the second camera operate in a user-selectable geometry tracking mode.

* * * * *